United States Patent
St. Pierre et al.

(10) Patent No.: US 12,505,645 B2
(45) Date of Patent: Dec. 23, 2025

(54) SYSTEMS AND METHODS FOR CORRELATING REGIONS OF INTEREST IN MULTIPLE IMAGING MODALITIES

(71) Applicant: HOLOGIC, INC., Marlborough, MA (US)

(72) Inventors: Shawn St. Pierre, Marlborough, MA (US); Christophe Fraschini, Aix-en-Provence (FR)

(73) Assignee: Hologic, Inc., Marlborough, MA (US)

( * ) Notice: Subject to any disclaimer, the term of this patent is extended or adjusted under 35 U.S.C. 154(b) by 134 days.

(21) Appl. No.: 17/910,162

(22) PCT Filed: Mar. 25, 2021

(86) PCT No.: PCT/US2021/024138
§ 371 (c)(1),
(2) Date: Sep. 8, 2022

(87) PCT Pub. No.: WO2021/195370
PCT Pub. Date: Sep. 30, 2021

(65) Prior Publication Data
US 2023/0103969 A1 Apr. 6, 2023

Related U.S. Application Data

(60) Provisional application No. 63/000,702, filed on Mar. 27, 2020.

(51) Int. Cl.
*G06V 10/75* (2022.01)
*G06T 7/00* (2017.01)

(52) U.S. Cl.
CPC .......... *G06V 10/759* (2022.01); *G06T 7/0014* (2013.01); *G06T 2207/30068* (2013.01);
(Continued)

(58) Field of Classification Search
CPC ............................ G06V 10/759; G06T 7/0014
See application file for complete search history.

(56) References Cited

U.S. PATENT DOCUMENTS 3,502,878 A 3/1970 Stewart
3,863,073 A 1/1975 Wagner
(Continued)

FOREIGN PATENT DOCUMENTS

AU 2014339982 4/2015
CN 1802121 A 7/2006
(Continued)

OTHER PUBLICATIONS

PCT International Preliminary Report on Patentability in International Searching Authority for International Patent Application No. PCT/US2021/024138 mailed Oct. 6, 2022, 13 pages.
(Continued)

*Primary Examiner* — Kevin Ky
(74) *Attorney, Agent, or Firm* — Merchant & Gould P.C.

(57) ABSTRACT

Methods and systems for identifying a region of interest in breast tissue utilize artificial intelligence to confirm that a target lesion identified during imaging the breast tissue using a first imaging modality (e.g. x-ray imaging) has been identified using a second imaging modality (e.g. ultrasound imaging). A computing system operating a lesion matching engine utilizes a machine learning classifier algorithm trained on cases of x-ray images and corresponding ultrasound images in which lesions were identified for further analysis. The lesion matching engine analyzes a target lesion identified with x-ray imaging and a potential lesion identified with ultrasound imaging to determine a likelihood that the target lesion is the same as the potential lesion. A confidence level indicator for the lesion match is presented (Continued)

on a display of a computing device to aid a healthcare provider in locating a lesion in breast tissue.

18 Claims, 12 Drawing Sheets

(52) U.S. Cl.
CPC ............... *G06T 2207/30096* (2013.01); *G06V 2201/032* (2022.01)

(56) References Cited

U.S. PATENT DOCUMENTS

| | | |
|---|---|---|
| 3,971,950 A | 7/1976 | Evans et al. |
| 4,160,906 A | 7/1979 | Daniels |
| 4,310,766 A | 1/1982 | Finkenzeller et al. |
| 4,496,557 A | 1/1985 | Malen et al. |
| 4,559,557 A | 12/1985 | Keyes |
| 4,559,641 A | 12/1985 | Caugant et al. |
| 4,706,269 A | 11/1987 | Reina et al. |
| 4,727,565 A | 2/1988 | Ericson |
| 4,744,099 A | 5/1988 | Huettenrauch |
| 4,773,086 A | 9/1988 | Fujita |
| 4,773,087 A | 9/1988 | Plewes |
| 4,819,258 A | 4/1989 | Kleinman et al. |
| 4,821,727 A | 4/1989 | Levene et al. |
| 4,907,156 A | 3/1990 | Doi et al. |
| 4,969,174 A | 11/1990 | Schied |
| 4,989,227 A | 1/1991 | Tirelli et al. |
| 5,018,176 A | 5/1991 | Romeas et al. |
| RE33,634 E | 7/1991 | Yanaki |
| 5,029,193 A | 7/1991 | Saffer |
| 5,051,904 A | 9/1991 | Griffith |
| 5,078,142 A | 1/1992 | Siczek et al. |
| 5,099,846 A | 3/1992 | Hardy |
| 5,129,911 A | 7/1992 | Siczek et al. |
| 5,133,020 A | 7/1992 | Giger et al. |
| 5,163,075 A | 11/1992 | Lubinsky |
| 5,164,976 A | 11/1992 | Scheid et al. |
| 5,199,056 A | 3/1993 | Darrah |
| 5,219,351 A | 6/1993 | Teubner |
| 5,240,011 A | 8/1993 | Assa |
| 5,279,309 A | 1/1994 | Taylor et al. |
| 5,280,427 A | 1/1994 | Magnusson |
| 5,289,520 A | 2/1994 | Pellegrino et al. |
| 5,343,390 A | 8/1994 | Doi et al. |
| 5,359,637 A | 10/1994 | Webbe |
| 5,365,562 A | 11/1994 | Toker |
| 5,386,447 A | 1/1995 | Siczek |
| 5,415,169 A | 5/1995 | Siczek et al. |
| 5,426,685 A | 6/1995 | Pellegrino et al. |
| 5,452,367 A | 9/1995 | Bick |
| 5,491,627 A | 2/1996 | Zhang et al. |
| 5,499,097 A | 3/1996 | Ortyn et al. |
| 5,506,877 A | 4/1996 | Niklason et al. |
| 5,526,394 A | 6/1996 | Siczek |
| 5,539,797 A | 7/1996 | Heidsieck et al. |
| 5,553,111 A | 9/1996 | Moore |
| 5,592,562 A | 1/1997 | Rooks |
| 5,594,769 A | 1/1997 | Pellegrino et al. |
| 5,596,200 A | 1/1997 | Sharma |
| 5,598,454 A | 1/1997 | Franetzki |
| 5,609,152 A | 3/1997 | Pellegrino et al. |
| 5,627,869 A | 5/1997 | Andrew et al. |
| 5,642,433 A | 6/1997 | Lee et al. |
| 5,642,441 A | 6/1997 | Riley et al. |
| 5,647,025 A | 7/1997 | Frost et al. |
| 5,657,362 A | 8/1997 | Giger et al. |
| 5,660,185 A | 8/1997 | Shmulewitz et al. |
| 5,668,889 A | 9/1997 | Hara |
| 5,671,288 A | 9/1997 | Wilhelm et al. |
| 5,709,206 A | 1/1998 | Teboul |
| 5,712,890 A | 1/1998 | Spivey |
| 5,719,952 A | 2/1998 | Rooks |
| 5,735,264 A | 4/1998 | Siczek et al. |
| 5,757,880 A | 5/1998 | Colomb |
| 5,763,871 A | 6/1998 | Ortyn et al. |
| 5,769,086 A | 6/1998 | Ritchart et al. |
| 5,773,832 A | 6/1998 | Sayed et al. |
| 5,803,912 A | 9/1998 | Siczek et al. |
| 5,818,898 A | 10/1998 | Tsukamoto et al. |
| 5,828,722 A | 10/1998 | Ploetz |
| 5,835,079 A | 11/1998 | Shieh |
| 5,841,124 A | 11/1998 | Ortyn et al. |
| 5,872,828 A | 2/1999 | Niklason et al. |
| 5,875,258 A | 2/1999 | Ortyn et al. |
| 5,878,104 A | 3/1999 | Ploetz |
| 5,878,746 A | 3/1999 | Lemelson et al. |
| 5,896,437 A | 4/1999 | Ploetz |
| 5,941,832 A | 8/1999 | Tumey |
| 5,954,650 A | 9/1999 | Saito |
| 5,986,662 A | 11/1999 | Argiro |
| 6,005,907 A | 12/1999 | Ploetz |
| 6,022,325 A | 2/2000 | Siczek et al. |
| 6,067,079 A | 5/2000 | Shieh |
| 6,075,879 A | 6/2000 | Roehrig et al. |
| 6,091,841 A | 7/2000 | Rogers |
| 6,091,981 A | 7/2000 | Cundari et al. |
| 6,101,236 A | 8/2000 | Wang et al. |
| 6,102,866 A | 8/2000 | Nields et al. |
| 6,137,527 A | 10/2000 | Abdel-Malek |
| 6,141,398 A | 10/2000 | He |
| 6,149,301 A | 11/2000 | Kautzer et al. |
| 6,175,117 B1 | 1/2001 | Komardin |
| 6,196,715 B1 | 3/2001 | Nambu |
| 6,215,892 B1 | 4/2001 | Douglass et al. |
| 6,216,540 B1 | 4/2001 | Nelson |
| 6,219,059 B1 | 4/2001 | Argiro |
| 6,233,473 B1 | 5/2001 | Sheperd |
| 6,243,441 B1 | 6/2001 | Zur |
| 6,245,028 B1 | 6/2001 | Furst et al. |
| 6,256,370 B1 | 7/2001 | Yavuz |
| 6,272,207 B1 | 8/2001 | Tang |
| 6,289,235 B1 | 9/2001 | Webber et al. |
| 6,292,530 B1 | 9/2001 | Yavus |
| 6,293,282 B1 | 9/2001 | Lemelson |
| 6,327,336 B1 | 12/2001 | Gingold et al. |
| 6,327,377 B1 | 12/2001 | Rutenberg et al. |
| 6,341,156 B1 | 1/2002 | Baetz |
| 6,375,352 B1 | 4/2002 | Hewes |
| 6,389,104 B1 | 5/2002 | Bani-Hashemi et al. |
| 6,411,836 B1 | 6/2002 | Patel |
| 6,415,015 B2 | 7/2002 | Nicolas |
| 6,424,332 B1 | 7/2002 | Powell |
| 6,442,288 B1 | 8/2002 | Haerer |
| 6,459,925 B1 | 10/2002 | Nields et al. |
| 6,463,181 B2 | 10/2002 | Duarte |
| 6,468,226 B1 | 10/2002 | McIntyre, IV |
| 6,480,565 B1 | 11/2002 | Ning |
| 6,501,819 B2 | 12/2002 | Unger et al. |
| 6,556,655 B1 | 4/2003 | Chichereau |
| 6,574,304 B1 | 6/2003 | Hsieh |
| 6,597,762 B1 | 7/2003 | Ferrant |
| 6,611,575 B1 | 8/2003 | Alyassin et al. |
| 6,620,111 B2 | 9/2003 | Stephens et al. |
| 6,626,849 B2 | 9/2003 | Huitema et al. |
| 6,633,674 B1 | 10/2003 | Barnes |
| 6,638,235 B2 | 10/2003 | Miller et al. |
| 6,647,092 B2 | 11/2003 | Eberhard |
| 6,650,928 B1 | 11/2003 | Gailly |
| 6,683,934 B1 | 1/2004 | Zhao |
| 6,744,848 B2 | 6/2004 | Stanton |
| 6,748,044 B2 | 6/2004 | Sabol et al. |
| 6,751,285 B2 | 6/2004 | Eberhard |
| 6,758,824 B1 | 7/2004 | Miller et al. |
| 6,813,334 B2 | 11/2004 | Koppe |
| 6,882,700 B2 | 4/2005 | Wang |
| 6,885,724 B2 | 4/2005 | Li |
| 6,901,156 B2 | 5/2005 | Giger et al. |
| 6,912,319 B1 | 6/2005 | Barnes |
| 6,940,943 B2 | 9/2005 | Claus |
| 6,978,040 B2 | 12/2005 | Berestov |
| 6,987,331 B2 | 1/2006 | Koeppe |
| 6,999,553 B2 | 2/2006 | Livingston |

(56) References Cited

U.S. PATENT DOCUMENTS

| | | |
|---|---|---|
| 6,999,554 B2 | 2/2006 | Mertelmeier |
| 7,022,075 B2 | 4/2006 | Grunwald et al. |
| 7,025,725 B2 | 4/2006 | Dione et al. |
| 7,030,861 B1 | 4/2006 | Westerman |
| 7,110,490 B2 | 9/2006 | Eberhard |
| 7,110,502 B2 | 9/2006 | Tsuji |
| 7,117,098 B1 | 10/2006 | Dunlay et al. |
| 7,123,684 B2 | 10/2006 | Jing et al. |
| 7,127,091 B2 | 10/2006 | OpDeBeek |
| 7,142,633 B2 | 11/2006 | Eberhard |
| 7,218,766 B2 | 5/2007 | Eberhard |
| 7,245,694 B2 | 7/2007 | Jing et al. |
| 7,286,634 B2 | 10/2007 | Sommer, Jr. et al. |
| 7,289,825 B2 | 10/2007 | Fors et al. |
| 7,298,881 B2 | 11/2007 | Giger et al. |
| 7,315,607 B2 | 1/2008 | Ramsauer |
| 7,319,735 B2 | 1/2008 | Defreitas et al. |
| 7,323,692 B2 | 1/2008 | Rowlands |
| 7,346,381 B2 | 3/2008 | Okerlund et al. |
| 7,406,150 B2 | 7/2008 | Minyard et al. |
| 7,430,272 B2 | 9/2008 | Jing et al. |
| 7,443,949 B2 | 10/2008 | Defreitas et al. |
| 7,466,795 B2 | 12/2008 | Eberhard et al. |
| 7,556,602 B2 | 7/2009 | Wang et al. |
| 7,577,282 B2 | 8/2009 | Gkanatsios et al. |
| 7,606,801 B2 | 10/2009 | Faitelson et al. |
| 7,616,801 B2 | 11/2009 | Gkanatsios et al. |
| 7,630,533 B2 | 12/2009 | Ruth et al. |
| 7,634,050 B2 | 12/2009 | Muller et al. |
| 7,640,051 B2 | 12/2009 | Krishnan |
| 7,697,660 B2 | 4/2010 | Ning |
| 7,702,142 B2 | 4/2010 | Ren et al. |
| 7,705,830 B2 | 4/2010 | Westerman et al. |
| 7,760,924 B2 | 7/2010 | Ruth et al. |
| 7,769,219 B2 | 8/2010 | Zahniser |
| 7,787,936 B2 | 8/2010 | Kressy |
| 7,809,175 B2 | 10/2010 | Roehrig et al. |
| 7,828,733 B2 | 11/2010 | Zhang et al. |
| 7,831,296 B2 | 11/2010 | DeFreitas et al. |
| 7,869,563 B2 | 1/2011 | DeFreitas |
| 7,974,924 B2 | 7/2011 | Holla et al. |
| 7,991,106 B2 | 8/2011 | Ren et al. |
| 8,044,972 B2 | 10/2011 | Hall et al. |
| 8,051,386 B2 | 11/2011 | Rosander et al. |
| 8,126,226 B2 | 2/2012 | Bernard et al. |
| 8,155,421 B2 | 4/2012 | Ren et al. |
| 8,165,365 B2 | 4/2012 | Bernard et al. |
| 8,532,745 B2 | 9/2013 | DeFreitas et al. |
| 8,571,289 B2 | 10/2013 | Ruth |
| 8,594,274 B2 | 11/2013 | Hoernig et al. |
| 8,677,282 B2 | 3/2014 | Cragun et al. |
| 8,712,127 B2 | 4/2014 | Ren et al. |
| 8,787,522 B2 | 7/2014 | Smith et al. |
| 8,897,535 B2 | 11/2014 | Ruth et al. |
| 8,983,156 B2 | 3/2015 | Periaswamy et al. |
| 9,020,579 B2 | 4/2015 | Smith |
| 9,075,903 B2 | 7/2015 | Marshall |
| 9,084,579 B2 | 7/2015 | Ren et al. |
| 9,119,599 B2 | 9/2015 | Itai |
| 9,129,362 B2 | 9/2015 | Jerebko |
| 9,289,183 B2 | 3/2016 | Karssemeijer |
| 9,451,924 B2 | 9/2016 | Bernard |
| 9,456,797 B2 | 10/2016 | Ruth et al. |
| 9,478,028 B2 | 10/2016 | Parthasarathy |
| 9,589,374 B1 | 3/2017 | Gao |
| 9,592,019 B2 | 3/2017 | Sugiyama |
| 9,805,507 B2 | 10/2017 | Chen |
| 9,808,215 B2 | 11/2017 | Ruth et al. |
| 9,811,758 B2 | 11/2017 | Ren et al. |
| 9,901,309 B2 | 2/2018 | DeFreitas et al. |
| 10,008,184 B2 | 6/2018 | Kreeger et al. |
| 10,010,302 B2 | 7/2018 | Ruth et al. |
| 10,074,199 B2 | 9/2018 | Robinson et al. |
| 10,092,358 B2 | 10/2018 | DeFreitas |
| 10,111,631 B2 | 10/2018 | Gkanatsios |
| 10,242,490 B2 | 3/2019 | Karssemeijer |
| 10,276,265 B2 | 4/2019 | Reicher et al. |
| 10,282,840 B2 | 5/2019 | Moehrle et al. |
| 10,335,094 B2 | 7/2019 | DeFreitas |
| 10,357,211 B2 | 7/2019 | Smith |
| 10,410,417 B2 | 9/2019 | Chen et al. |
| 10,413,263 B2 | 9/2019 | Ruth et al. |
| 10,444,960 B2 | 10/2019 | Marshall |
| 10,456,213 B2 | 10/2019 | DeFreitas |
| 10,573,276 B2 | 2/2020 | Kreeger et al. |
| 10,575,807 B2 | 3/2020 | Gkanatsios |
| 10,595,954 B2 | 3/2020 | DeFreitas |
| 10,624,598 B2 | 4/2020 | Chen |
| 10,977,863 B2 | 4/2021 | Chen |
| 10,978,026 B2 | 4/2021 | Kreeger |
| 11,419,565 B2 | 8/2022 | Gkanatsios |
| 11,508,340 B2 | 11/2022 | Kreeger |
| 11,589,944 B2 | 2/2023 | DeFreitas |
| 11,663,780 B2 | 5/2023 | Chen |
| 11,701,199 B2 | 7/2023 | DeFreitas |
| 2001/0038681 A1 | 11/2001 | Stanton et al. |
| 2001/0038861 A1 | 11/2001 | Hsu et al. |
| 2002/0012450 A1 | 1/2002 | Tsuji |
| 2002/0050986 A1 | 5/2002 | Inoue |
| 2002/0075997 A1 | 6/2002 | Unger et al. |
| 2002/0113681 A1 | 8/2002 | Byram |
| 2002/0122533 A1 | 9/2002 | Marie et al. |
| 2002/0188466 A1 | 12/2002 | Barrette et al. |
| 2002/0193676 A1 | 12/2002 | Bodicker |
| 2003/0007598 A1 | 1/2003 | Wang |
| 2003/0018272 A1 | 1/2003 | Treado et al. |
| 2003/0026386 A1 | 2/2003 | Tang |
| 2003/0048260 A1 | 3/2003 | Matusis |
| 2003/0073895 A1 | 4/2003 | Nields et al. |
| 2003/0095624 A1 | 5/2003 | Eberhard et al. |
| 2003/0097055 A1 | 5/2003 | Yanof |
| 2003/0128893 A1 | 7/2003 | Castorina |
| 2003/0135115 A1 | 7/2003 | Burdette et al. |
| 2003/0169847 A1 | 9/2003 | Karellas |
| 2003/0194050 A1 | 10/2003 | Eberhard |
| 2003/0194121 A1 | 10/2003 | Eberhard et al. |
| 2003/0194124 A1 | 10/2003 | Suzuki et al. |
| 2003/0195433 A1 | 10/2003 | Turovskiy |
| 2003/0210254 A1 | 11/2003 | Doan |
| 2003/0212327 A1 | 11/2003 | Wang |
| 2003/0215120 A1 | 11/2003 | Uppaluri |
| 2004/0008809 A1 | 1/2004 | Webber |
| 2004/0008900 A1 | 1/2004 | Jabri et al. |
| 2004/0008901 A1 | 1/2004 | Avinash |
| 2004/0036680 A1 | 2/2004 | Davis |
| 2004/0047518 A1 | 3/2004 | Tiana |
| 2004/0052328 A1 | 3/2004 | Saboi |
| 2004/0064037 A1 | 4/2004 | Smith |
| 2004/0066884 A1 | 4/2004 | Claus |
| 2004/0066904 A1 | 4/2004 | Eberhard et al. |
| 2004/0070582 A1 | 4/2004 | Smith et al. |
| 2004/0077938 A1 | 4/2004 | Mark et al. |
| 2004/0081273 A1 | 4/2004 | Ning |
| 2004/0094167 A1 | 5/2004 | Brady |
| 2004/0101095 A1 | 5/2004 | Jing et al. |
| 2004/0109028 A1 | 6/2004 | Stern et al. |
| 2004/0109529 A1 | 6/2004 | Eberhard et al. |
| 2004/0127789 A1 | 7/2004 | Ogawa |
| 2004/0138569 A1 | 7/2004 | Grunwald |
| 2004/0171933 A1 | 9/2004 | Stoller et al. |
| 2004/0171986 A1 | 9/2004 | Tremaglio, Jr. et al. |
| 2004/0267157 A1 | 12/2004 | Miller et al. |
| 2005/0047636 A1 | 3/2005 | Gines et al. |
| 2005/0049521 A1 | 3/2005 | Miller et al. |
| 2005/0063509 A1 | 3/2005 | Defreitas et al. |
| 2005/0078797 A1 | 4/2005 | Danielsson et al. |
| 2005/0084060 A1 | 4/2005 | Seppi et al. |
| 2005/0089205 A1 | 4/2005 | Kapur |
| 2005/0105679 A1 | 5/2005 | Wu et al. |
| 2005/0107689 A1 | 5/2005 | Sasano |
| 2005/0111718 A1 | 5/2005 | MacMahon |
| 2005/0113680 A1 | 5/2005 | Ikeda et al. |
| 2005/0113681 A1 | 5/2005 | DeFreitas et al. |
| 2005/0113715 A1 | 5/2005 | Schwindt et al. |

(56) References Cited

U.S. PATENT DOCUMENTS

| | | |
|---|---|---|
| 2005/0124845 A1 | 6/2005 | Thomadsen et al. |
| 2005/0135555 A1 | 6/2005 | Claus |
| 2005/0135664 A1 | 6/2005 | Kaufhold |
| 2005/0226375 A1 | 10/2005 | Eberhard |
| 2006/0004278 A1* | 1/2006 | Giger ................ G06T 7/35 600/408 |
| 2006/0009693 A1 | 1/2006 | Hanover et al. |
| 2006/0018526 A1 | 1/2006 | Avinash |
| 2006/0025680 A1 | 2/2006 | Jeune-Iomme |
| 2006/0030784 A1 | 2/2006 | Miller et al. |
| 2006/0074288 A1 | 4/2006 | Kelly et al. |
| 2006/0098855 A1 | 5/2006 | Gkanatsios et al. |
| 2006/0129062 A1 | 6/2006 | Nicoson et al. |
| 2006/0132508 A1 | 6/2006 | Sadikali |
| 2006/0147099 A1 | 7/2006 | Marshall et al. |
| 2006/0154267 A1 | 7/2006 | Ma et al. |
| 2006/0155209 A1 | 7/2006 | Miller et al. |
| 2006/0197753 A1 | 9/2006 | Hotelling |
| 2006/0210131 A1 | 9/2006 | Wheeler |
| 2006/0228012 A1 | 10/2006 | Masuzawa |
| 2006/0238546 A1 | 10/2006 | Handley |
| 2006/0257009 A1 | 11/2006 | Wang |
| 2006/0269040 A1 | 11/2006 | Mertelmeier |
| 2006/0274928 A1 | 12/2006 | Collins et al. |
| 2006/0291618 A1 | 12/2006 | Eberhard et al. |
| 2007/0014468 A1 | 1/2007 | Gines et al. |
| 2007/0019846 A1 | 1/2007 | Bullitt et al. |
| 2007/0030949 A1 | 2/2007 | Jing et al. |
| 2007/0036265 A1 | 2/2007 | Jing et al. |
| 2007/0046649 A1 | 3/2007 | Reiner |
| 2007/0047793 A1 | 3/2007 | Wu et al. |
| 2007/0052700 A1 | 3/2007 | Wheeler et al. |
| 2007/0076844 A1 | 4/2007 | Defreitas et al. |
| 2007/0114424 A1 | 5/2007 | Danielsson et al. |
| 2007/0118400 A1 | 5/2007 | Morita et al. |
| 2007/0156451 A1 | 7/2007 | Gering |
| 2007/0223651 A1 | 9/2007 | Wagenaar et al. |
| 2007/0225600 A1 | 9/2007 | Weibrecht et al. |
| 2007/0236490 A1 | 10/2007 | Casteele |
| 2007/0242800 A1 | 10/2007 | Jing et al. |
| 2007/0263765 A1 | 11/2007 | Wu |
| 2007/0274585 A1 | 11/2007 | Zhang et al. |
| 2008/0019581 A1 | 1/2008 | Gkanatsios et al. |
| 2008/0043905 A1 | 2/2008 | Hassanpourgol |
| 2008/0045833 A1 | 2/2008 | DeFreitas et al. |
| 2008/0101537 A1 | 5/2008 | Sendai |
| 2008/0114614 A1 | 5/2008 | Mahesh et al. |
| 2008/0125643 A1 | 5/2008 | Huisman |
| 2008/0130979 A1 | 6/2008 | Ren |
| 2008/0139896 A1 | 6/2008 | Baumgart |
| 2008/0152086 A1 | 6/2008 | Hall |
| 2008/0165136 A1 | 7/2008 | Christie et al. |
| 2008/0187095 A1 | 8/2008 | Boone et al. |
| 2008/0198966 A1 | 8/2008 | Hjarn |
| 2008/0221479 A1 | 9/2008 | Ritchie |
| 2008/0229256 A1 | 9/2008 | Shibaike |
| 2008/0240533 A1 | 10/2008 | Piron et al. |
| 2008/0297482 A1 | 12/2008 | Weiss |
| 2009/0003519 A1 | 1/2009 | DeFreitas |
| 2009/0005668 A1 | 1/2009 | West et al. |
| 2009/0005693 A1 | 1/2009 | Brauner |
| 2009/0010384 A1 | 1/2009 | Jing et al. |
| 2009/0034684 A1 | 2/2009 | Bernard |
| 2009/0037821 A1 | 2/2009 | O'Neal et al. |
| 2009/0063118 A1 | 3/2009 | Dachille et al. |
| 2009/0079705 A1 | 3/2009 | Sizelove et al. |
| 2009/0080594 A1 | 3/2009 | Brooks et al. |
| 2009/0080602 A1 | 3/2009 | Brooks et al. |
| 2009/0080604 A1 | 3/2009 | Shores et al. |
| 2009/0080752 A1 | 3/2009 | Ruth |
| 2009/0080765 A1 | 3/2009 | Bernard et al. |
| 2009/0087067 A1 | 4/2009 | Khorasani |
| 2009/0123052 A1 | 5/2009 | Ruth |
| 2009/0129644 A1 | 5/2009 | Daw et al. |
| 2009/0135997 A1 | 5/2009 | Defreitas et al. |
| 2009/0138280 A1 | 5/2009 | Morita et al. |
| 2009/0143674 A1 | 6/2009 | Nields |
| 2009/0167702 A1 | 7/2009 | Nurmi |
| 2009/0171244 A1 | 7/2009 | Ning |
| 2009/0238424 A1 | 9/2009 | Arakita |
| 2009/0259958 A1 | 10/2009 | Ban |
| 2009/0268865 A1 | 10/2009 | Ren et al. |
| 2009/0278812 A1 | 11/2009 | Yasutake |
| 2009/0296882 A1 | 12/2009 | Gkanatsios et al. |
| 2009/0304147 A1 | 12/2009 | Jing et al. |
| 2010/0034348 A1 | 2/2010 | Yu |
| 2010/0049046 A1 | 2/2010 | Peiffer |
| 2010/0054400 A1 | 3/2010 | Ren et al. |
| 2010/0067648 A1 | 3/2010 | Kojima |
| 2010/0074864 A1* | 3/2010 | Achiron ................ A61P 37/00 435/6.16 |
| 2010/0079405 A1 | 4/2010 | Bernstein |
| 2010/0086188 A1 | 4/2010 | Ruth et al. |
| 2010/0088346 A1 | 4/2010 | Urness et al. |
| 2010/0098214 A1 | 4/2010 | Star-Lack et al. |
| 2010/0105879 A1 | 4/2010 | Katayose et al. |
| 2010/0121178 A1 | 5/2010 | Krishnan |
| 2010/0131294 A1 | 5/2010 | Venon |
| 2010/0131482 A1 | 5/2010 | Linthicum et al. |
| 2010/0135558 A1 | 6/2010 | Ruth et al. |
| 2010/0152570 A1 | 6/2010 | Navab |
| 2010/0166147 A1 | 7/2010 | Abenaim |
| 2010/0166267 A1 | 7/2010 | Zhang |
| 2010/0171764 A1 | 7/2010 | Feng et al. |
| 2010/0189322 A1 | 7/2010 | Sakagawa |
| 2010/0195882 A1 | 8/2010 | Ren et al. |
| 2010/0208037 A1 | 8/2010 | Sendai |
| 2010/0231522 A1 | 9/2010 | Li |
| 2010/0246884 A1 | 9/2010 | Chen et al. |
| 2010/0246909 A1 | 9/2010 | Blum |
| 2010/0259561 A1 | 10/2010 | Forutanpour et al. |
| 2010/0259645 A1 | 10/2010 | Kaplan |
| 2010/0260316 A1 | 10/2010 | Stein et al. |
| 2010/0280375 A1 | 11/2010 | Zhang |
| 2010/0293500 A1 | 11/2010 | Cragun |
| 2011/0018817 A1 | 1/2011 | Kryze |
| 2011/0019891 A1 | 1/2011 | Puong |
| 2011/0054944 A1 | 3/2011 | Sandberg et al. |
| 2011/0069808 A1 | 3/2011 | Defreitas et al. |
| 2011/0069906 A1 | 3/2011 | Park |
| 2011/0087132 A1 | 4/2011 | DeFreitas et al. |
| 2011/0105879 A1 | 5/2011 | Masumoto |
| 2011/0109650 A1 | 5/2011 | Kreeger |
| 2011/0110570 A1 | 5/2011 | Bar-Shalev |
| 2011/0110576 A1 | 5/2011 | Kreeger |
| 2011/0123073 A1 | 5/2011 | Gustafson |
| 2011/0125526 A1 | 5/2011 | Gustafson |
| 2011/0134113 A1 | 6/2011 | Ma et al. |
| 2011/0150447 A1 | 6/2011 | Li |
| 2011/0157154 A1 | 6/2011 | Bernard et al. |
| 2011/0163939 A1 | 7/2011 | Tam et al. |
| 2011/0178389 A1 | 7/2011 | Kumar et al. |
| 2011/0182402 A1 | 7/2011 | Partain |
| 2011/0234630 A1 | 9/2011 | Batman et al. |
| 2011/0237927 A1 | 9/2011 | Brooks et al. |
| 2011/0242092 A1 | 10/2011 | Kashiwagi |
| 2011/0287949 A1* | 11/2011 | Poznansky ....... G01N 33/57449 506/7 |
| 2011/0310126 A1 | 12/2011 | Georgiev et al. |
| 2012/0014501 A1 | 1/2012 | Pelc |
| 2012/0014504 A1 | 1/2012 | Jang |
| 2012/0014578 A1* | 1/2012 | Karssemeijer ........ G06T 7/0012 382/131 |
| 2012/0069951 A1 | 3/2012 | Toba |
| 2012/0106698 A1 | 5/2012 | Karim |
| 2012/0127297 A1 | 5/2012 | Baxi |
| 2012/0131488 A1 | 5/2012 | Karlsson et al. |
| 2012/0133600 A1 | 5/2012 | Marshall |
| 2012/0133601 A1 | 5/2012 | Marshall |
| 2012/0134464 A1 | 5/2012 | Hoernig et al. |
| 2012/0148151 A1 | 6/2012 | Hamada |
| 2012/0150034 A1 | 6/2012 | DeFreitas et al. |
| 2012/0189092 A1 | 7/2012 | Jerebko |
| 2012/0194425 A1 | 8/2012 | Buelow |

(56) References Cited

U.S. PATENT DOCUMENTS

| | | |
|---|---|---|
| 2012/0238870 A1 | 9/2012 | Smith et al. |
| 2012/0277625 A1 | 11/2012 | Nakayama |
| 2012/0293511 A1 | 11/2012 | Mertelmeier |
| 2013/0016255 A1 | 1/2013 | Bhatt |
| 2013/0022165 A1 | 1/2013 | Jang |
| 2013/0044861 A1 | 2/2013 | Muller |
| 2013/0059758 A1 | 3/2013 | Haick |
| 2013/0108138 A1 | 5/2013 | Nakayama |
| 2013/0121569 A1 | 5/2013 | Yadav |
| 2013/0121618 A1 | 5/2013 | Yadav |
| 2013/0202168 A1 | 8/2013 | Jerebko |
| 2013/0259193 A1 | 10/2013 | Packard |
| 2013/0272494 A1 | 10/2013 | DeFreitas |
| 2014/0033126 A1 | 1/2014 | Kreeger |
| 2014/0035811 A1 | 2/2014 | Guehring |
| 2014/0044333 A1 | 2/2014 | Barth, Jr. et al. |
| 2014/0064444 A1 | 3/2014 | Oh |
| 2014/0073913 A1 | 3/2014 | DeFreitas et al. |
| 2014/0082542 A1 | 3/2014 | Zhang et al. |
| 2014/0200433 A1 | 7/2014 | Choi |
| 2014/0219534 A1 | 8/2014 | Wiemker et al. |
| 2014/0219548 A1 | 8/2014 | Wels |
| 2014/0276061 A1 | 9/2014 | Lee et al. |
| 2014/0327702 A1 | 11/2014 | Kreeger et al. |
| 2014/0328517 A1 | 11/2014 | Gluncic |
| 2015/0004558 A1 | 1/2015 | Inglese |
| 2015/0052471 A1 | 2/2015 | Chen |
| 2015/0061582 A1 | 3/2015 | Tatsuta et al. |
| 2015/0238148 A1 | 8/2015 | Georgescu |
| 2015/0258271 A1 | 9/2015 | Love |
| 2015/0302146 A1 | 10/2015 | Marshall |
| 2015/0309712 A1 | 10/2015 | Marshall |
| 2015/0317538 A1 | 11/2015 | Ren et al. |
| 2015/0327518 A1* | 11/2015 | Han ................. A61D 17/00 348/143 |
| 2015/0331995 A1 | 11/2015 | Zhao |
| 2016/0000399 A1 | 1/2016 | Halmann et al. |
| 2016/0022364 A1 | 1/2016 | DeFreitas et al. |
| 2016/0051215 A1 | 2/2016 | Chen |
| 2016/0078645 A1 | 3/2016 | Abdurahman |
| 2016/0140749 A1 | 5/2016 | Erhard |
| 2016/0210774 A1 | 7/2016 | Wiskin et al. |
| 2016/0228034 A1 | 8/2016 | Gluncic |
| 2016/0235380 A1 | 8/2016 | Smith |
| 2016/0350933 A1 | 12/2016 | Schieke |
| 2016/0364526 A1 | 12/2016 | Reicher et al. |
| 2016/0367210 A1 | 12/2016 | Gkanatsios |
| 2017/0071562 A1 | 3/2017 | Suzuki |
| 2017/0132792 A1 | 5/2017 | Jerebko et al. |
| 2017/0202453 A1 | 7/2017 | Sekiguchi |
| 2017/0262737 A1 | 9/2017 | Rabinovich |
| 2018/0008220 A1 | 1/2018 | Boone et al. |
| 2018/0008236 A1 | 1/2018 | Venkataraman et al. |
| 2018/0047211 A1 | 2/2018 | Chen et al. |
| 2018/0109698 A1 | 4/2018 | Ramsay et al. |
| 2018/0132722 A1 | 5/2018 | Eggers et al. |
| 2018/0137385 A1 | 5/2018 | Ren |
| 2018/0144244 A1 | 5/2018 | Masoud |
| 2018/0172691 A1* | 6/2018 | Poznansky ....... G01N 33/57411 |
| 2018/0256118 A1 | 9/2018 | DeFreitas |
| 2019/0000318 A1 | 1/2019 | Caluser |
| 2019/0015173 A1 | 1/2019 | DeFreitas |
| 2019/0037173 A1 | 1/2019 | Lee et al. |
| 2019/0043456 A1 | 2/2019 | Kreeger |
| 2019/0057778 A1* | 2/2019 | Porter ................. G16H 50/50 |
| 2019/0125301 A1 | 5/2019 | Jago |
| 2019/0287241 A1 | 9/2019 | Hill et al. |
| 2019/0290221 A1 | 9/2019 | Smith |
| 2019/0313963 A1* | 10/2019 | Hillen ................. G06V 10/764 |
| 2019/0325573 A1 | 10/2019 | Bernard et al. |
| 2019/0380684 A1 | 12/2019 | Insana et al. |
| 2020/0008653 A1* | 1/2020 | Kamon ............. A61B 1/00055 |
| 2020/0046303 A1 | 2/2020 | DeFreitas |
| 2020/0054300 A1 | 2/2020 | Kreeger et al. |
| 2020/0069285 A1 | 3/2020 | Annangi et al. |
| 2020/0093562 A1 | 3/2020 | DeFreitas |
| 2020/0184262 A1 | 6/2020 | Chui |
| 2020/0205928 A1 | 7/2020 | DeFreitas |
| 2020/0253573 A1 | 8/2020 | Gkanatsios |
| 2020/0323512 A1 | 10/2020 | Ng et al. |
| 2020/0345320 A1 | 11/2020 | Chen |
| 2020/0359991 A1 | 11/2020 | Xu |
| 2020/0381103 A1* | 12/2020 | Froloff ................. G16H 30/40 |
| 2020/0390404 A1 | 12/2020 | DeFreitas |
| 2021/0000553 A1 | 1/2021 | St. Pierre |
| 2021/0022586 A1* | 1/2021 | Mori ................. A61B 1/045 |
| 2021/0081302 A1* | 3/2021 | Reicher ................. G06N 3/045 |
| 2021/0100518 A1 | 4/2021 | Chui |
| 2021/0100626 A1 | 4/2021 | St. Pierre |
| 2021/0113167 A1 | 4/2021 | Chui |
| 2021/0118199 A1 | 4/2021 | Chui |
| 2021/0158936 A1* | 5/2021 | Rao ................. G16H 40/67 |
| 2021/0174504 A1 | 6/2021 | Madabhushi |
| 2021/0212665 A1 | 7/2021 | Tsymbalenko |
| 2021/0248744 A1 | 8/2021 | Rijken |
| 2022/0005277 A1 | 1/2022 | Chen |
| 2022/0013089 A1 | 1/2022 | Kreeger |
| 2022/0036545 A1 | 2/2022 | St. Pierre |
| 2022/0192615 A1 | 6/2022 | Chui |
| 2022/0254023 A1 | 8/2022 | McKinney et al. |
| 2022/0386969 A1 | 12/2022 | Smith |
| 2023/0000467 A1 | 1/2023 | Shi |
| 2023/0008465 A1 | 1/2023 | Smith |
| 2023/0033601 A1 | 2/2023 | Chui |
| 2023/0038498 A1 | 2/2023 | Xu |
| 2023/0053489 A1 | 2/2023 | Kreeger |
| 2023/0054121 A1 | 2/2023 | Chui |
| 2023/0056692 A1 | 2/2023 | Gkanatsios |
| 2023/0082494 A1 | 3/2023 | Chui |
| 2023/0098305 A1 | 3/2023 | St. Pierre |
| 2023/0103969 A1* | 4/2023 | St. Pierre ............. A61B 8/0825 382/128 |
| 2023/0124481 A1 | 4/2023 | St. Pierre |
| 2023/0125385 A1 | 4/2023 | Solis |
| 2023/0225821 A1 | 7/2023 | DeFreitas |
| 2023/0230679 A1 | 7/2023 | Chen |
| 2023/0240785 A1 | 8/2023 | DeFreitas |
| 2023/0344453 A1 | 10/2023 | Yang |
| 2023/0394769 A1 | 12/2023 | Chen |
| 2024/0169958 A1 | 5/2024 | Kreeger |
| 2024/0315654 A1 | 9/2024 | Chui |
| 2024/0320827 A1 | 9/2024 | Chui |
| 2024/0338864 A1 | 10/2024 | Chui |
| 2024/0341698 A1 | 10/2024 | DeFreitas |
| 2025/0118433 A1* | 4/2025 | Sagawa ................. A61C 19/04 |

FOREIGN PATENT DOCUMENTS

| | | |
|---|---|---|
| CN | 1846622 | 10/2006 |
| CN | 101066212 A | 11/2007 |
| CN | 102169530 A | 8/2011 |
| CN | 202161328 | 3/2012 |
| CN | 102429678 | 5/2012 |
| CN | 102473300 A | 5/2012 |
| CN | 105193447 | 12/2015 |
| CN | 106659468 A | 5/2017 |
| CN | 107440730 | 12/2017 |
| CN | 112561908 A | 3/2021 |
| DE | 102010009295 | 8/2011 |
| DE | 102011087127 | 5/2013 |
| EP | 775467 | 5/1997 |
| EP | 982001 | 3/2000 |
| EP | 1428473 | 6/2004 |
| EP | 2236085 | 6/2010 |
| EP | 2215600 | 8/2010 |
| EP | 2301432 | 3/2011 |
| EP | 2491863 | 8/2012 |
| EP | 1986548 | 1/2013 |
| EP | 2656789 | 10/2013 |
| EP | 2823464 | 1/2015 |
| EP | 2823765 | 1/2015 |
| EP | 2889743 | 7/2015 |
| EP | 3060132 | 4/2019 |
| JP | H09-35043 | 2/1997 |

(56) References Cited

FOREIGN PATENT DOCUMENTS

| | | |
|---|---|---|
| JP | H09-198490 | 7/1997 |
| JP | H09-238934 | 9/1997 |
| JP | H10-33523 | 2/1998 |
| JP | 2000-200340 | 7/2000 |
| JP | 2002-109510 | 4/2002 |
| JP | 2002-282248 | 10/2002 |
| JP | 2003-126073 | 5/2003 |
| JP | 2003-189179 | 7/2003 |
| JP | 2003-199737 | 7/2003 |
| JP | 2003-531516 | 10/2003 |
| JP | 2004254742 | 9/2004 |
| JP | 2005-110843 | 4/2005 |
| JP | 2005-522305 | 7/2005 |
| JP | 2005-227350 | 8/2005 |
| JP | 2005-322257 | 11/2005 |
| JP | 2006-519634 | 8/2006 |
| JP | 2006-312026 | 11/2006 |
| JP | 2007-130487 | 5/2007 |
| JP | 2007-216022 | 8/2007 |
| JP | 2007-325928 | 12/2007 |
| JP | 2007-330334 | 12/2007 |
| JP | 2007-536968 | 12/2007 |
| JP | 2008-068032 | 3/2008 |
| JP | 2008518684 | 6/2008 |
| JP | 2008-253401 | 10/2008 |
| JP | 2009-034503 | 2/2009 |
| JP | 2009-522005 | 6/2009 |
| JP | 2009-526618 | 7/2009 |
| JP | 2009-207545 | 9/2009 |
| JP | 2010-137004 | 6/2010 |
| JP | 2011-110175 A | 6/2011 |
| JP | 2012-011255 | 1/2012 |
| JP | 2012-501750 | 1/2012 |
| JP | 2012-061196 | 3/2012 |
| JP | 2013-059658 A | 4/2013 |
| JP | 2013-150826 A | 8/2013 |
| JP | 2013-530768 | 8/2013 |
| JP | 2013-244211 | 12/2013 |
| JP | 2014-507250 | 3/2014 |
| JP | 2014-534042 | 12/2014 |
| JP | 2015-506794 | 3/2015 |
| JP | 2015-144632 A | 8/2015 |
| JP | 2016-198197 | 12/2015 |
| JP | 2016059743 | 4/2016 |
| JP | 2017-000364 | 1/2017 |
| JP | 2017-056358 | 3/2017 |
| JP | 2018-099180 A | 6/2018 |
| KR | 1020130046378 A | 5/2013 |
| KR | 10-2015-0010515 | 1/2015 |
| KR | 10-2017-0062839 | 6/2017 |
| WO | 90/05485 | 5/1990 |
| WO | 93/17620 | 9/1993 |
| WO | 94/06352 | 3/1994 |
| WO | 1997/00649 | 1/1997 |
| WO | 1998/16903 | 4/1998 |
| WO | 00/51484 | 9/2000 |
| WO | 2003/020114 | 3/2003 |
| WO | 03/077202 | 9/2003 |
| WO | 2005051197 | 6/2005 |
| WO | 2005110230 | 11/2005 |
| WO | 2005112767 | 12/2005 |
| WO | 2006/055830 | 5/2006 |
| WO | 2006/058160 | 6/2006 |
| WO | 2007/095330 | 8/2007 |
| WO | 08/014670 | 2/2008 |
| WO | 2008047270 | 4/2008 |
| WO | 2008/050823 | 5/2008 |
| WO | 2008/054436 | 5/2008 |
| WO | 2009/026587 | 2/2009 |
| WO | 2010/028208 | 3/2010 |
| WO | 2010059920 | 5/2010 |
| WO | 2011008239 | 1/2011 |
| WO | 2011/043838 | 4/2011 |
| WO | 2011065950 | 6/2011 |
| WO | 2011073864 | 6/2011 |
| WO | 2011091300 | 7/2011 |
| WO | 2012/001572 | 1/2012 |
| WO | 2012/068373 | 5/2012 |
| WO | 2012063653 | 5/2012 |
| WO | 2012/112627 | 8/2012 |
| WO | 2012/122399 | 9/2012 |
| WO | 2013/001439 | 1/2013 |
| WO | 2013/035026 | 3/2013 |
| WO | 2013/078476 | 5/2013 |
| WO | 2013/123091 | 8/2013 |
| WO | 2013/136222 | 9/2013 |
| WO | 2014/080215 | 5/2014 |
| WO | 2014/149554 | 9/2014 |
| WO | 2014/207080 | 12/2014 |
| WO | 2015/061582 | 4/2015 |
| WO | 2015/066650 | 5/2015 |
| WO | 2015/130916 | 9/2015 |
| WO | 2016/103094 | 6/2016 |
| WO | 2016/184746 | 11/2016 |
| WO | 2016/206942 | 12/2016 |
| WO | 2018/183548 | 10/2018 |
| WO | 2018/183549 | 10/2018 |
| WO | 2018/183550 | 10/2018 |
| WO | 2018/236565 | 12/2018 |
| WO | 2019/032558 | 2/2019 |
| WO | WO-2019091807 A1 * | 5/2019 ............ A61B 5/055 |
| WO | 2021/021329 | 2/2021 |
| WO | 2021/168281 A1 | 8/2021 |
| WO | 2021/195084 A1 | 9/2021 |

OTHER PUBLICATIONS

Cho, N. et al., "Distinguishing Benign from Malignant Masses at Breast US: Combined US Elastography and Color Doppler US-Influence on Radiologist Accuracy", Radiology, 262(1): 80-90 (Jan. 2012).

Lee, E. et al., "Combination of Quantitative Parameters of Shear Wave Elastography and Superb Microvascular Imaging to Evaluate Breast Masses", Korean Journal of Radiology: Official Journal of the Korean Radiological Society, 21(9): 1045-1054 (Jan. 2020).

Kim, Eun Sil, et al., "Significance of microvascular evaluation of ductal lesions on breast ultrasonography: Influence on diagnostic performance", Clinical Imaging, Elsevier, NY, vol. 51, Jun. 6, 2018, pp. 252-259.

Love, Susan M., et al. "Anatomy of the nipple and breast ducts revisited", American Cancer Society, Philadelphia, PA, vol. 101, No. 9, Sep. 20, 2004, pp. 1947-1957.

"Filtered Back Projection", (NYGREN), published May 8, 2007, URL: http://web.archive.org/web/19991010131715/http://www.owlnet.rice.edu/~elec539/Projects97/cult/node 2.html, 2 pgs.

"Supersonic to feature Aixplorer Ultimate at ECR", AuntiMinnie.com, 3 pages (Feb. 2018).

Al Sallab et al., "Self Learning Machines Using Deep Networks", Soft Computing and Pattern Recognition (SoCPaR), 2011 Int'l. Conference of IEEE, Oct. 14, 2011, pp. 21-26.

Berg, WA et al., "Combined screening with ultrasound and mammography vs mammography alone in women at elevated risk of breast cancer", JAMA 299:2151-2163, 2008.

Burbank, Fred, "Stereotactic Breast Biopsy: Its History, Its Present, and Its Future", published in 1996 at the Southeastern Surgical Congress, 24 pages.

Bushberg, Jerrold et al., "The Essential Physics of Medical Imaging", 3rd ed., In: "The Essential Physics of Medical Imaging, Third Edition", Dec. 28, 2011, Lippincott & Wilkins, Philadelphia, PA, USA, XP05579051, pp. 270-272.

Caroline, B.E. et al., "Computer aided detection of masses in digital breast tomosynthesis: A review", 2012 International Conference on Emerging Trends in Science, Engineering and Technology (INCOSET), Tiruchirappalli, 2012, pp. 186-191.

Carton, AK, et al., "Dual-energy contrast-enhanced digital breast tomosynthesis—a feasibility study", Br J Radiol. Apr. 2010;83 (988):344-50.

Chan, Heang-Ping et al., "Computer-aided detection system for breast masses on digital tomosynthesis mammograms: Preliminary Experience", Radiology, Dec. 2005, 1075-1080.

(56) References Cited

OTHER PUBLICATIONS

Chan, Heang-Ping et al., "ROC Study of the effect of stereoscopic imaging on assessment of breast lesions," Medical Physics, vol. 32, No. 4, Apr. 2005, 1001-1009.

Chen, SC, et al., "Initial clinical experience with contrast-enhanced digital breast tomosynthesis", Acad Radio. Feb. 2007 14(2):229-38.

Conner, Peter, "Breast Response to Menopausal Hormone Therapy—Aspects on Proliferation, apoptosis and Mammographic Density", 2007 Annals of Medicine, 39;1, 28-41.

Diekmann, Felix et al., "Thick Slices from Tomosynthesis Data Sets: Phantom Study for the Evaluation of Different Algorithms", Journal of Digital Imaging, Springer, vol. 22, No. 5, Oct. 23, 2007, pp. 519-526.

Diekmann, Felix., et al., "Digital mammography using iodine-based contrast media: initial clinical experience with dynamic contrast medium enhancement", Invest Radiol 2005; 40:397-404.

Dromain C., et al., "Contrast enhanced spectral mammography: a multi-reader study", RSNA 2010, 96th Scientific Assembly and Scientific Meeting.

Dromain, C., et al., "Contrast-enhanced digital mammography", Eur J Radiol. 2009; 69:34-42.

Dromain, Clarisse et al., "Dual-energy contrast-enhanced digital mammography: initial clinical results", European Radiology, Sep. 14, 2010, vol. 21, pp. 565-574.

Dromain, Clarisse, et al., "Evaluation of tumor angiogenesis of breast carcinoma using contrast-enhanced digital mammography", AJR: 187, Nov. 2006, 16 pages.

Duan, Xiaoman et al., "Matching corresponding regions of interest on cranio-caudal and medio-lateral oblique view mammograms", IEEE Access, vol. 7, Mar. 25, 2019, pp. 31586-31597, XP011715754, DOI: 10.1109/Access.2019.2902854, retrieved on Mar. 20, 2019, abstract.

E. Shaw de Paredes et al., "Interventional Breast Procedure", published Sep./Oct. 1998 in Curr Probl Diagn Radiol, pp. 138-184.

EFilm Mobile HD by Merge Healthcare, web site: http://itunes.apple.com/bw/app/efilm-mobile-hd/id405261243?mt=8, accessed on Nov. 3, 2011 (2 pages).

EFilm Solutions, eFilm Workstation (tm) 3.4, website: http://estore.merge.com/na/estore/content.aspx?productID=405, accessed on Nov. 3, 2011 (2 pages).

Elbakri, Idris A. et al., "Automatic exposure control for a slot scanning full field digital mammography system", Med. Phys. Sep. 2005; 32(9):2763-2770, Abstract only.

Ertas, M. et al., "2D versus 3D total variation minimization in digital breast tomosynthesis", 2015 IEEE International Conference on Imaging Systems and Techniques (IST), Macau, 2015, pp. 1-4.

Feng, Steve Si Jia, et al., "Clinical digital breast tomosynthesis system: Dosimetric Characterization", Radiology, Apr. 2012, 263(1); pp. 35-42.

Fischer Imaging Corp, Mammotest Plus manual on minimally invasive breast biopsy system, 2002, 8 pages.

Fischer Imaging Corporation, Installation Manual, MammoTest Family of Breast Biopsy Systems, 86683G, 86684G, P-55957-IM, Issue 1, Revision 3, Jul. 2005, 98 pages.

Fischer Imaging Corporation, Operator Manual, MammoTest Family of Breast Biopsy Systems, 86683G, 86684G, P-55956-OM, Issue 1, Revision 6, Sep. 2005, 258 pages.

Freiherr, G., "Breast tomosynthesis trials show promise", Diagnostic Imaging—San Francisco 2005, V27; N4:42-48.

Georgian-Smith, Dianne, et al., "Stereotactic Biopsy of the Breast Using an Upright Unit, a Vacuum-Suction Needle, and a Lateral Arm-Support System", 2001, at the American Roentgen Ray Society meeting, 8 pages.

Ghiassi, M. et al., "A Dynamic Architecture for Artificial Networks", Neurocomputing, vol. 63, Aug. 20, 2004, pp. 397-413.

Giger et al. "Development of a smart workstation for use in mammography", in Proceedings of SPIE, vol. 1445 (1991), pp. 101103; 4 pages.

Giger et al., "An Intelligent Workstation for Computer-aided Diagnosis", in RadioGraphics, May 1993, 13:3 pp. 647-656; 10 pages.

Glick, Stephen J., "Breast CT", Annual Rev. Biomed. Eng., 2007, 9;501-26.

Hologic, "Lorad StereoLoc II" Operator's Manual 9-500-0261, Rev. 005, 2004, 78 pgs.

Hologic, Inc., 510(k) Summary, prepared Nov. 28, 2010, for Affirm Breast Biopsy Guidance System Special 510(k) Premarket Notification, 5 pages.

Hologic, Inc., 510(k) Summary, prepared Aug. 14, 2012, for Affirm Breast Biopsy Guidance System Special 510(k) Premarket Notification, 5 pages.

ICRP Publication 60: 1990 Recommendations of the International Commission on Radiological Protection, 12 pages.

Ijaz, Umer Zeeshan, et al., "Mammography phantom studies using 3D electrical impedance tomography with numerical forward solver", Frontiers in the Convergence of Bioscience and Information Technologies 2007, 379-383.

Jochelson, M., et al., "Bilateral Dual Energy contrast-enhanced digital mammography: Initial Experience", RSNA 2010, 96th Scientific Assembly and Scientific Meeting, 1 page.

Jong, RA, et al., Contrast-enhanced digital mammography: initial clinical experience. Radiology 2003; 228:842-850.

Kao, Tzu-Jen et al., "Regional admittivity spectra with tomosynthesis images for breast cancer detection", Proc. Of the 29th Annual Int'l. Conf. of the IEEE EMBS, Aug. 23-26, 2007, 4142-4145.

Koechli, Ossi R., "Available Sterotactic Systems for Breast Biopsy", Renzo Brun del Re (Ed.), Minimally Invasive Breast Biopsies, Recent Results in Cancer Research 173:105-113; Springer-Verlag, 2009.

Kopans, Daniel B., "Breast Imaging", 3rd Edition, Lippincott Williams and Wilkins, published Nov. 2, 2006, pp. 960-967.

Kopans, et al. Will tomosynthesis replace conventional mammography? Plenary Session SFN08: RSNA 2005.

Lehman, CD, et al. MRI evaluation of the contralateral breast in women with recently diagnosed breast cancer. N Engl J Med 2007; 356:1295-1303.

Lewin, JM, et al., Dual-energy contrast-enhanced digital subtraction mammography: feasibility. Radiology 2003; 229:261-268.

Lilja, Mikko, "Fast and accurate voxel projection technique in free-form cone-beam geometry with application to algebraic reconstruction," Applies Sciences on Biomedical and Communication Technologies, 2008, Isabel '08, first international symposium on, IEEE, Piscataway, NJ, Oct. 25, 2008.

Lindfors, KK, et al., Dedicated breast CT: initial clinical experience. Radiology 2008; 246(3): 725-733.

Mahesh, Mahadevappa, "AAPM/RSNA Physics Tutorial for Residents—Digital Mammography: An Overview", Nov.-Dec. 2004, vol. 24, No. 6, 1747-1760.

Metheany, Kathrine G. et al., "Characterizing anatomical variability in breast CT images", Oct. 2008, Med. Phys. 35 (10); 4685-4694.

Niklason, L., et al., Digital tomosynthesis in breast imaging. Radiology. Nov. 1997; 205(2):399-406.

Nikunjc, Oza et al., Dietterich, T.G., Ed., "Ensemble methods in machine learning", Jan. 1, 2005, Multiple Classifier Systems, Lecture Notes in Computer Science; LNCS, Springer-Verlag Berlin/Heidelberg, pp. 1-15, abstract.

Pathmanathan et al., "Predicting tumour location by simulating large deformations of the breast using a 3D finite element model and nonlinear elasticity", Medical Image Computing and Computer-Assisted Intervention, pp. 217-224, vol. 3217 (2004).

Pediconi, "Color-coded automated signal intensity-curve for detection and characterization of breast lesions: Preliminary evaluation of new software for MR-based breast imaging," International Congress Series 1281 (2005) 1081-1086.

Poplack, SP, et al, Digital breast tomosynthesis: initial experience in 98 women with abnormal digital screening mammography. AJR Am J Roentgenology Sep. 2007 189(3):616-23.

Prionas, ND, et al., Contrast-enhanced dedicated breast CT: initial clinical experience. Radiology. Sep. 2010 256(3):714-723.

Rafferty, E. et al., "Assessing Radiologist Performance Using Combined Full-Field Digital Mammography and Breast Tomosynthesis Versus Full-Field Digital Mammography Alone: Results" presented at 2007 Radiological Society of North America meeting, Chicago IL.

(56) References Cited

OTHER PUBLICATIONS

Reynolds, April, "Stereotactic Breast Biopsy: A Review", Radiologic Technology, vol. 80, No. 5, Jun. 1, 2009, pp. 447M-464M, XP055790574.

Sakic et al., "Mammogram synthesis using a 3D simulation. I. breast tissue model and image acquisition simulation" Medical Physics. 29, pp. 2131-2139 (2002).

Samani, A et al., "Biomechanical 3-D Finite Element Modeling of the Human Breast Using MRI Data", 2001, IEEE Transactions on Medical Imaging, vol. 20, No. 4, pp. 271-279.

Samulski, Maurice et al., "Optimizing case-based detection performance in a multiview CAD system for mammography", IEEE Transactions on Medical Imaging, vol. 30, No. 4, Apr. 1, 2011, pp. 1001-1009, XP011352387, ISSN: 0278-0062, DOI: 10.1109/TMI.2011.2105886, abstract.

Sechopoulos, et al., "Glandular radiation dose in tomosynthesis of the breast using tungsten targets", Journal of Applied Clinical Medical Physics, vol. 8, No. 4, Fall 2008, 161-171.

Shrading, Simone et al., "Digital Breast Tomosynthesis-guided Vacuum-assisted Breast Biopsy: Initial Experiences and Comparison with Prone Stereotactic Vacuum-assisted Biopsy", the Department of Diagnostic and Interventional Radiology, Univ. of Aachen, Germany, published Nov. 12, 2014, 10 pgs.

Smith, A., "Full field breast tomosynthesis", Radiol Manage. Sep.-Oct. 2005; 27(5):25-31.

Taghibakhsh, f. et al., "High dynamic range 2-TFT amplified pixel sensor architecture for digital mammography tomosynthesis", IET Circuits Devices Syst., 2007, 1(10, pp. 87-92.

Van Schie, Guido, et al., "Generating Synthetic Mammograms from Reconstructed Tomosynthesis Volumes", IEEE Transactions on Medical Imaging, vol. 32, No. 12, Dec. 2013, 2322-2331.

Van Schie, Guido, et al., "Mass detection in reconstructed digital breast tomosynthesis volumes with a computer-aided detection system trained on 2D mammograms", Med. Phys. 40(4), Apr. 2013, 41902-1-41902-11.

Varjonen, Mari, "Three-Dimensional Digital Breast Tomosynthesis in the Early Diagnosis and Detection of Breast Cancer", IWDM 2006, LNCS 4046, 152-159.

Weidner N, et al., "Tumor angiogenesis and metastasis: correlation in invasive breast carcinoma", New England Journal of Medicine 1991; 324:1-8.

Weidner, N, "The importance of tumor angiogenesis: the evidence continues to grow", Am J Clin Pathol. Nov. 2004 122(5):696-703.

Wen, Junhai et al., "A study on truncated cone-beam sampling strategies for 3D mammography", 2004, IEEE, 3200-3204.

Williams, Mark B. et al., "Optimization of exposure parameters in full field digital mammography", Medical Physics 35, 2414 (May 20, 2008); doi: 10.1118/1.2912177, pp. 2414-2423.

Wodajo, Felasfa, MD, "Now Playing: Radiology Images from Your Hospital PACS on your iPad," Mar. 17, 2010; web site: http://www.imedicalapps.com/2010/03/now-playing-radiology-images-from-your-hospital-pacs-on-your-ipad/, accessed on Nov. 3, 2011 (3 pages).

Yin, H.M., et al., "Image Parser: a tool for finite element generation from three-dimensional medical images", BioMedical Engineering Online. 3:31, pp. 1-9, Oct. 1, 2004.

Zhang, Yiheng et al., "A comparative study of limited-angle cone-beam reconstruction methods for breast tomosythesis", Med Phys., Oct. 2006, 33(10): 3781-3795.

Zhao, Bo, et al., "Imaging performance of an amorphous selenium digital mammography detector in a breast tomosynthesis system", May 2008, Med. Phys 35(5); 1978-1987.

Perek, S. et al., "Siamese network for dual-view mammography mass matching", Image Analysis for Moving Organ, Breast & Thoracic Images: 3rd Int'l Workshop, RAMBO 2018, 4th Int'l Workshop, BIA 2018, and 1st Int'l Workshop, TIA 2018, Proceedings 3.Springer International Publishing, 2018.

International Search Report and Written Opinion of the International Searching Authority for International Patent Application No. PCT/US2021/024138 mailed Sep. 3, 2021, 17 pages.

Green, C. et al., "Deformable mapping using biochemical models to relate corresponding lesions in digital breast tomosynthesis and automated breast ultrasound images", Medical Image Analysis, 60: 1-18 (Nov. 2019).

Chung et al., "Finite element model of breast compression during mammography", CMBES Proc., vol. 28, No. 1, Dec. 2005.

Kapur, Ajay et al., "Combination of digital mammography with semi-automated 3D breast ultrasound", Technol Cancer Res Treat, Aug. 2004; 3(4):325-334.

* cited by examiner

SYSTEMS AND METHODS FOR CORRELATING REGIONS OF INTEREST IN MULTIPLE IMAGING MODALITIES

This application is a National Stage Application of PCT/US2021/024138, filed on Mar. 25, 2021, which claims the benefit of priority to U.S. Provisional Patent Application Ser. No. 63/000,702, filed Mar. 27, 2020, the entire disclosures of which are incorporated by reference in their entireties. To the extent appropriate, a claim of priority is made to each of the above disclosed applications.

BACKGROUND

Medical imaging provides a non-invasive method to visualize the internal structure of a patient. Visualization methods can be used to screen for and diagnose cancer in a patient. For example, early screening can detect lesions within a breast that might be cancerous so that treatment can take place at an early stage in the disease.

Mammography and tomosynthesis utilize x-ray radiation to visualize breast tissue. These techniques are often used to screen patients for potentially cancerous lesions. Traditional mammograms involve acquiring two-dimensional images of the breast from various angles. Tomosynthesis produces a plurality of x-ray images, each of discrete layers or slices of the breast, through the entire thickness thereof. Tomosynthesis pieces together a three-dimensional visualization of the breast. Mammography and tomosynthesis are typically performed while the patient is standing and the patient's breast tissue is under compression.

If a lesion is found, a diagnostic ultrasound may be the next step in determining whether the patient has a tumor. Ultrasound uses sound waves, typically produced by piezoelectric transducers, to image tissue in a patient. Ultrasound imaging provides a different view of tissue that can make it easier to identify solid masses. An ultrasound probe focuses the sound waves by producing an arc-shaped sound wave that travels into the body and is partially reflected from the layers between different tissues in the patient. The reflected sound wave is detected by the transducers and converted into electrical signals that can be processed by the ultrasound scanner to form an ultrasound image of the tissue. Ultrasound is typically performed while the patient is in a supine position and the patient's breast tissue is not under compression.

During diagnostic ultrasound imaging procedures, technologists and radiologists often have difficulty navigating to and locating a lesion previously identified during x-ray imaging. It is challenging to correlate the position of the lesion from x-ray imaging to ultrasound imaging because the former is performed while the patient is upright and the breast tissue is under compression while the latter is performed while the patient is lying down and the breast tissue is not under compression. Additionally, the ultrasound imaging has different levels of contrast and has a different appearance than x-ray imaging. Lesions detected in x-ray imaging procedures are becoming increasingly smaller as technology improves making it more difficult to locate the small lesions in an ultrasound image.

It is against this background that the present disclosure is made. Techniques and improvements are provided herein.

SUMMARY

Examples of the disclosure are directed to a method of locating a region of interest within a breast. An indication of a location of a target lesion within a breast is received at a computing device. The target lesion was identified during imaging of the breast using a first imaging modality. An image of the breast is obtained by a second imaging modality and a potential lesion is identified in the image. The first image including the target lesion is analyzed with a lesion matching engine operating on the computing system to compare it to a second image including a potential lesion using artificial intelligence. A probability that the potential lesion corresponds to the target lesion is determined and an indicator of the level of confidence is output for display on a graphical user interface.

In another aspect, a lesion identification system includes a processing device and a memory storing instructions that, when executed by the processing device, facilitate performance of operations. The operations include: accessing an x-ray image of a breast, the x-ray image including an identified lesion indicated with a visual marker; receiving an ultrasound image of the breast, the ultrasound image including an indication of a potential lesion; analyzing the potential lesion and the identified lesion using an artificial intelligence lesion classifier; generating a confidence score indicating a likelihood that the potential lesion in the ultrasound image matches the identified lesion in the x-ray image; and displaying an output associated with the confidence score on a graphical user interface.

In yet another aspect, a non-transitory machine-readable storage medium stores executable instructions that, when executed by a processor, facilitate performance of operations. The operations include: obtaining data for a target lesion from a data store, wherein the data was obtained with x-ray imaging and includes at least an image of the target lesion and coordinates for a location of the target lesion within a breast; recording an image of the breast obtained by ultrasound imaging; identifying a general area of interest in the recorded image of the breast obtained by ultrasound based on the coordinates of the target lesion; identifying a potential lesion in the general area of interest; analyzing, using an artificial intelligence lesion classifier, the potential lesion to compare the potential lesion to the target lesion and determine a level of confidence that the potential lesion corresponds to the target lesion; and outputting an indicator of the level of confidence on a graphical user interface.

In another aspect, a lesion identification system includes at least one optical camera, a projector, a processing device, and a memory storing instructions that, when executed by the processing device, facilitate performance of operations. The operations include capturing at least one optical image of a breast of a patient using the at least one optical camera; accessing at least one tomosynthesis image of the breast; receiving an indication of a target lesion on the at least one tomosynthesis image; co-registering the at least one optical image and the at least one tomosynthesis image of the breast by analyzing with artificial intelligence algorithms for region matching and a non-rigid deformable model; creating a probability map based on the co-registering and the indication of the target lesion, where the map indicates a likelihood that the target lesion is located at each of a plurality of points on the breast; and projecting, with the projector, the probability map onto the breast.

The details of one or more techniques are set forth in the accompanying drawings and the description below. Other features, objects, and advantages of these techniques will be apparent from the description, drawings, and claims.

DETAILED DESCRIPTION

Figure 1:
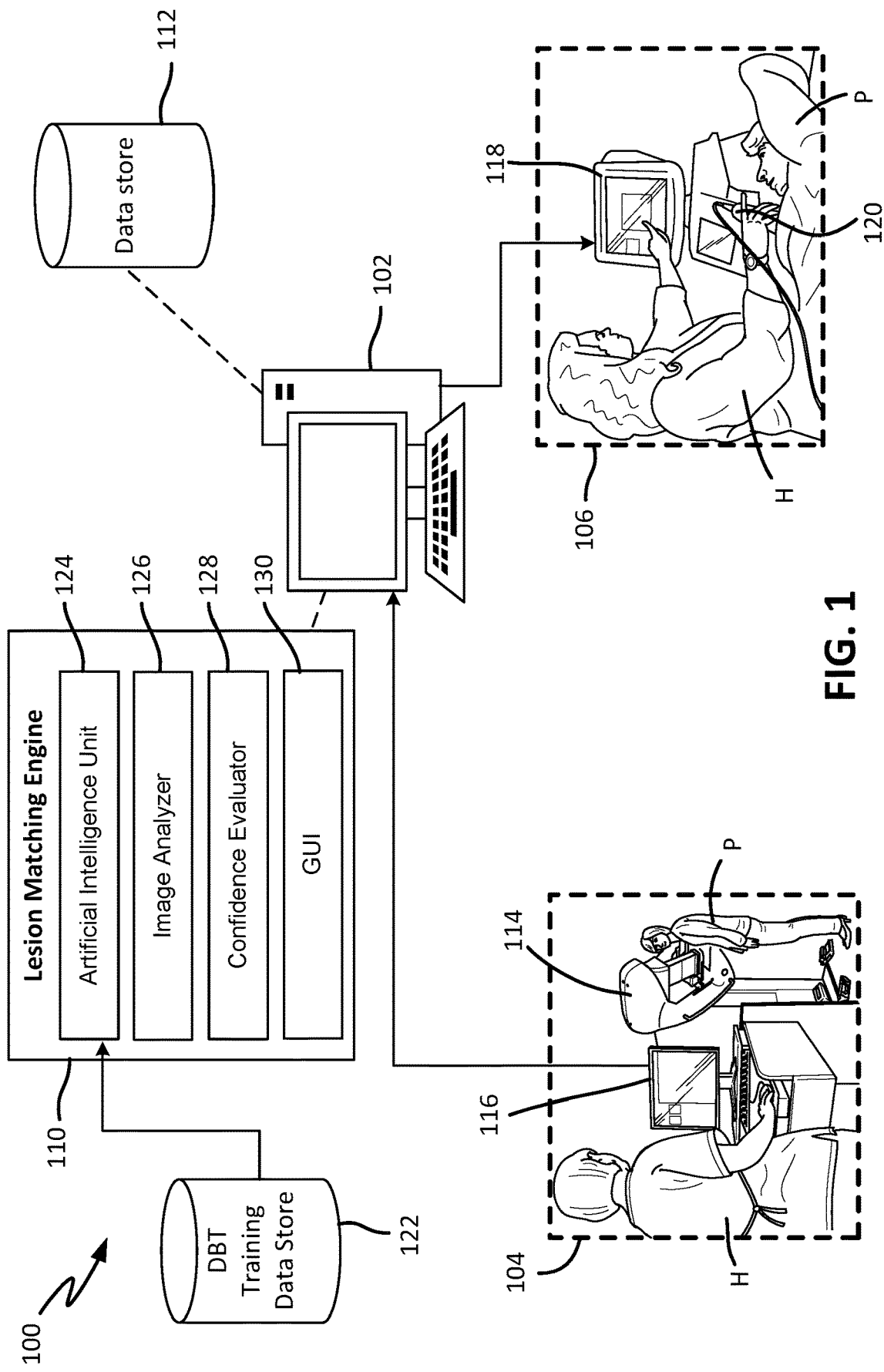
FIG. 1 illustrates an example system for locating a region of interest within a breast.

The present disclosure is directed to systems and methods for locating a lesion within breast tissue using an imaging device. In particular, a computing system utilizes machine learning to navigate to a potential lesion and provide a confidence level indicator for a correlation between a lesion identified in a breast with ultrasound imaging and a lesion identified with x-ray imaging.

An important step in evaluating breast health is a screening x-ray imaging procedure (e.g., mammography or tomosynthesis). In about 10-15% of cases, a lesion is identified in the x-ray images that cause a patient to be recalled for additional imaging to determine if a lesion is potentially cancerous. Diagnostic imaging is then performed and this typically employs ultrasound technology. Ultrasound imaging can more accurately distinguish cysts from solid masses and ultrasound is the preferred imaging modality should a biopsy be needed.

Despite the benefits of ultrasound, clinicians may find it difficult to locate the same lesion identified during x-ray imaging while performing ultrasound imaging. This is due to three main factors. The first is that the position of the breast is different in an ultrasound procedure as compared to an x-ray imaging procedure (e.g., mammography or tomosynthesis). Typically the patient is in an upright position with the breast under compression during x-ray imaging while the patient is typically in a supine position and the breast is not under compression during ultrasound. This shift in position can make it difficult to correlate lesions found in the x-ray image with an image produced by ultrasound.

The second reason is that the ultrasound imaging modality looks different than the x-ray imaging with different contrasts. It can be difficult to be confident that the lesion identified in ultrasound is the same one previously identified with x-ray imaging.

Third, as technology continues to improve, lesions that can be detected with x-ray imaging procedures are becoming increasingly smaller. This makes it more difficult for a healthcare practitioner to find the lesions in an ultrasound image.

The computing system described herein operates to provide a confidence level indicator of a correlation between a lesion identified with ultrasound and a lesion identified with x-ray imaging. The computing system uses an artificial intelligence (AI) model trained on a library of digital breast tomosynthesis (DBT) cases and corresponding radiologist-correlated diagnostic ultrasound cases. The AI model analyzes new DBT and ultrasound images to determine if one lesion correlates to another. Additionally, the AI model can provide a confidence level indicator to a user to aid them in determining whether they have found the same lesion. In some cases, the AI model can be employed in conjunction with electromagnetic or optical tracking inputs to speed navigation to the target area during ultrasound and reduce the imaging set to be analyzed. In some examples, the AI model utilizes form factors to calculate the confidence levels. Form factors include morphological features of breast tissue that can be used to identify a particular region of the breast. In some examples, the form factors are visual features on the surface of the breast such as moles, freckles, and tattoos.

FIG. 1 illustrates an example lesion identification system 100 for locating a region of interest within a breast. The system 100 includes a computing system 102, an x-ray imaging system 104, and an ultrasound imaging system 106. In some examples, the lesion identification system 100 operates to guide a healthcare practitioner to a location of interest in a breast during ultrasound imaging based on data collected during an x-ray imaging procedure where the location of interest was first identified. In some examples, lesion identification system 100 provides a confidence level indicator to a healthcare practitioner on a display to aid the healthcare practitioner in confirming that a lesion visible on an ultrasound image is the same lesion identified previously in an x-ray image.

The computing system 102 operates to process and store information received from the x-ray imaging system 104 and ultrasound imaging system 106. In the example of FIG. 1, the computing system 102 includes a lesion matching engine 110 and a data store 112. In some examples, the lesion matching engine 110 and data store 112 are housed within the memory of the computing system 102. In some examples, the computing system 102 accesses the lesion matching engine 110 and data store 112 from a remote server such as a cloud computing environment. Though FIG. 1 shows the computing system 102 as standing alone from other components of the system 100, it could also be incorporated into the x-ray computing device 116, the ultrasound computing device 118, or another computing device utilized in patient care. In some examples, the computing system 102 includes two or more computing devices.

The lesion matching engine 110 operates to analyze x-ray images of a target lesion and ultrasound images of a potential lesion to determine if the potential lesion is the same as the target lesion. In the example of FIG. 1, a data store of DBT training data 122 is utilized to train an artificial intelligence unit 124. The DBT training data store 122 stores multiple example cases of identified lesions with corresponding ultrasound images and x-ray images. The example cases are matches confirmed by healthcare professionals. The artificial intelligence unit 124 analyzes these example cases using a machine learning algorithm to identify features that can be used to match ultrasound images with x-ray images. These features are used to generate an image classifier.

Various machine learning techniques can be utilized to generate a lesion classifier. In some examples, the machine learning algorithm is a supervised machine learning algorithm. In other examples, the machine learning algorithm is an unsupervised machine learning algorithm. In some examples, the machine learning algorithm is based on an artificial neural network. In some examples, the neural network is a deep neural network (DNN). In some examples, the machine learning algorithm is a convolutional deep neural network (CNN). In some examples, a combination of two or more networks are utilized to generate the classifier. In some examples, two or more algorithms are utilizes to generate features from the example case data.

The resulting trained machine learning classifier is utilized by the image analyzer 126 to compare sets of x-ray images and ultrasound images. Various indicators are utilized to compare lesions including shape, color, margins, orientation, texture, pattern, density, stiffness, size, and depth within the breast. In some examples, the indicator is a numerical value. The confidence evaluator 128 operates in conjunction with the image analyzer 126 to determine a level of confidence that a potential lesion identified with ultrasound imaging is the same as a lesion identified with x-ray imaging. In some examples, a confidence score is generated by the confidence evaluator 128. In some examples, the confidence level could indicate a category of confidence such as "high," "medium," or "low." In alternative examples, the confidence level is provided as a percentage such as "99%," "75%," or "44%." Finally, the graphical user interface (GUI) 130 operates to present information on a display of a computing device. In some examples, the GUI 130 display a confidence level indicator over one or more images of tissue being analyzed.

In some examples, the lesion matching engine 110 operates to perform region matching on two different types of images. In some examples, the region matching is performed using artificial intelligence algorithms to use form factors and other features of breast tissue to match regions of a breast between two different imaging modalities. In some examples, the analysis provides a probabilistic value for a location at which the lesion is expected to be located on a breast using co-registration techniques. In some examples, the artificial intelligence models operate in conjunction with non-rigid deformable models to determine a likelihood that a target lesion and a potential lesion are the same.

The data store 112 operates to store information received from the x-ray imaging system 104, ultrasound imaging system 106, and lesion matching engine 110. In some examples, the data store 112 is actually two or more separate data stores. For example, one data store could be a remote data store that stores images from x-ray imaging systems. Another data store could be housed locally within the computing system 102. In some examples, the data store 112 could be part of an electronic medical record (EMR) system.

The x-ray imaging system 104 operates to take images of breast tissue using x-ray radiation. The x-ray imaging system 104 includes an x-ray imaging device 114 and an x-ray computing device 116 in communication with the x-ray imaging device 114. In some examples, the x-ray imaging system 104 performs digital breast tomosynthesis (DBT). The x-ray imaging device 114 is described in further detail in relation to FIGS. 3-5. The x-ray computing device 116 operates to receive inputs from a healthcare provider H to operate the x-ray imaging device 114 and view images received from the x-ray imaging device 114.

The ultrasound imaging system 106 operates to take images of breast tissue using ultrasonic sound waves. The ultrasound imaging system 106 is described in further detail in relation to FIGS. 6-7. The ultrasound imaging system 106 includes an ultrasound computing device 118 and an ultrasound imaging device 120. The ultrasound computing device 118 operates to receive inputs from a healthcare provider H to operate the ultrasound imaging device 120 and view images received from the ultrasound imaging device 120.

FIG. 1 illustrates how information obtained from an x-ray imaging system 104 could be utilized by an ultrasound imaging system 106. A healthcare provider H operates the x-ray computing device 116 to capture x-ray images of the breast of a patient P using the x-ray imaging device 114. The x-ray image may be taken as part of a routine health screening. During the screening, the healthcare provider H identifies one or more regions of interest in the patient P's breast that require additional analysis to determine if lesions within those regions of interest are potentially cancerous and require a biopsy.

In some examples, coordinates for the regions of interest can be recorded at the x-ray computing device 116 and communicated to the computing system 102. The coordinates recorded by the x-ray computing device 116 are analyzed using as tissue deformation model, as described in U.S. Provisional Patent Application No. 63/000,700, filed Mar. 27, 2020, the entirety of which is incorporated by reference.

In some examples, a first set of coordinates identifies a location of a lesion identified while the breast is under compression. The first set of coordinates are translated into a second set of coordinates identifying a predicted location of the identified lesion while the breast is not under compression. A region of interest in the ultrasound image is identified that corresponds to the second set of coordinates. This enables a healthcare practitioner to identify the potential lesion in the ultrasound image.

The output of the analysis is a set of predicted coordinates that can be communicated to the ultrasound computing device 118 to be used at a later imaging exam, which may be in a location different than that where the imaging procedure was performed. A healthcare provider H operating the ultrasound computing device 118 uses the predicted coordinates to navigate to the region of interest on the patient P's breast using the ultrasound imaging device 120.

In some examples, the x-ray images are displayed on a user interface of the ultrasound computing device 118 along with ultrasound images that are received from the ultrasound imaging device 120. Additional information can be displayed on the ultrasound computing device 118 such as predicted coordinates of a region of interest and indications of biomarkers on an image of the patient's breast. In some examples, a visual marker is displayed on the image indicating the location of a target lesion. In some examples, a probability mapping can be displayed on the image indicating where the target lesion is most likely to be located.

The healthcare provider H operating the ultrasound computing device 118 locates a potential lesion in an ultrasound image that is potentially a match for a lesion previously identified in an x-ray image for the same patient P. The ultrasound image and an indication of the potential lesion are communicated to the computing system 102 for analysis. In some examples, a mammography image, a target region of interest, and B-mode imaging is displayed on the same GUI. The GUI 130 helps to visually guide an operator of an ultrasound system to the region of interest while also automating documentation of an ultrasound probe's position, orientation, and annotations.

In some examples, x-ray images including an identified lesion and ultrasound images including a potential lesion are analyzed by the lesion matching engine 110 of the computing system 102. The lesion matching engine 110 outputs a confidence level indicator for the potential lesion and communicates that confidence level indicator to the ultrasound computing device 118. The confidence level indicator could be a numeric value, a color, or a category that is displayed on a GUI on the ultrasound computing device 118. An example GUI is described in FIG. 10.

Figure 11:
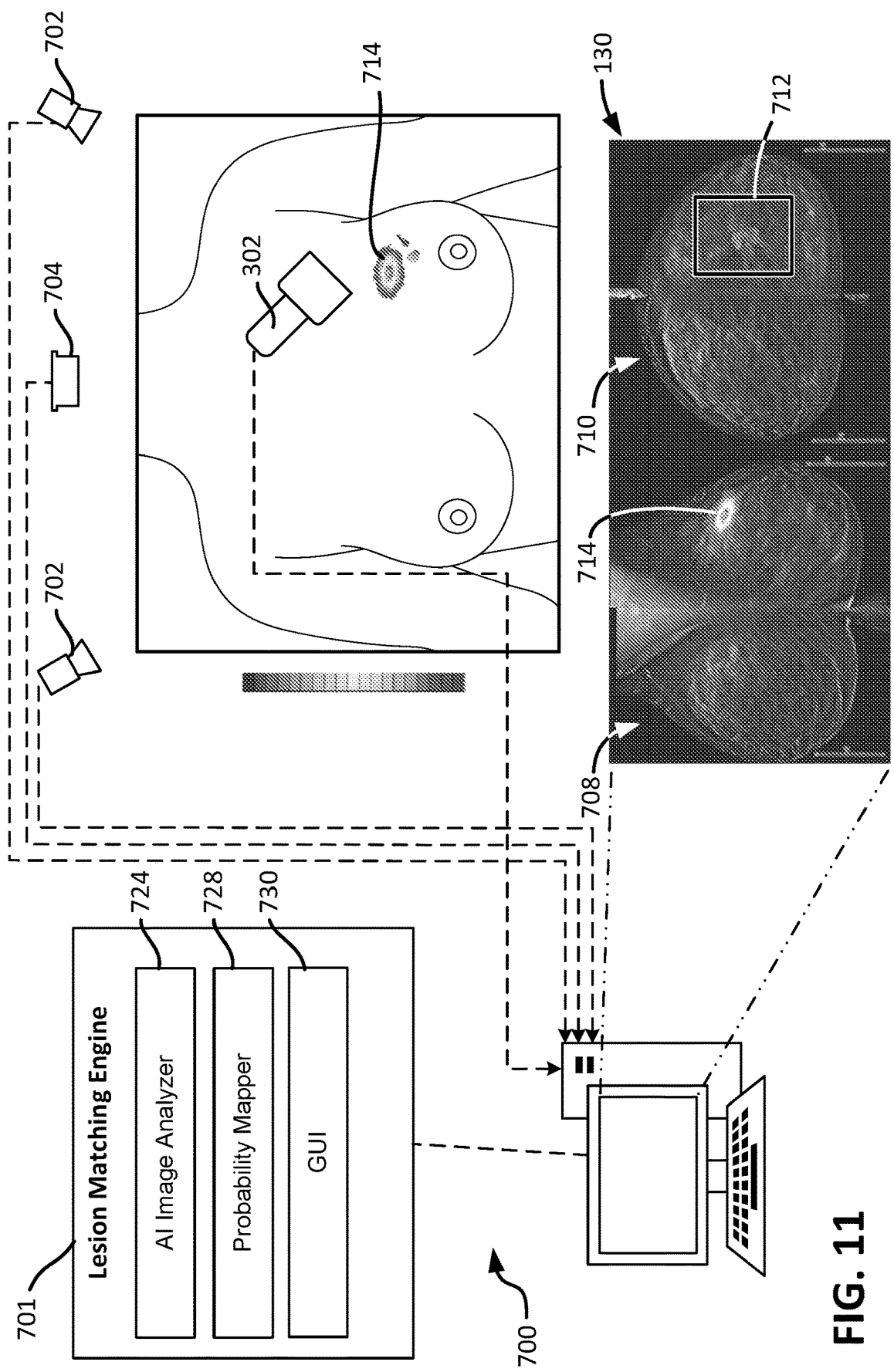
FIG. 11 illustrates a schematic diagram of an example system for correlating lesions in images obtained from different modalities.
Figure 12:
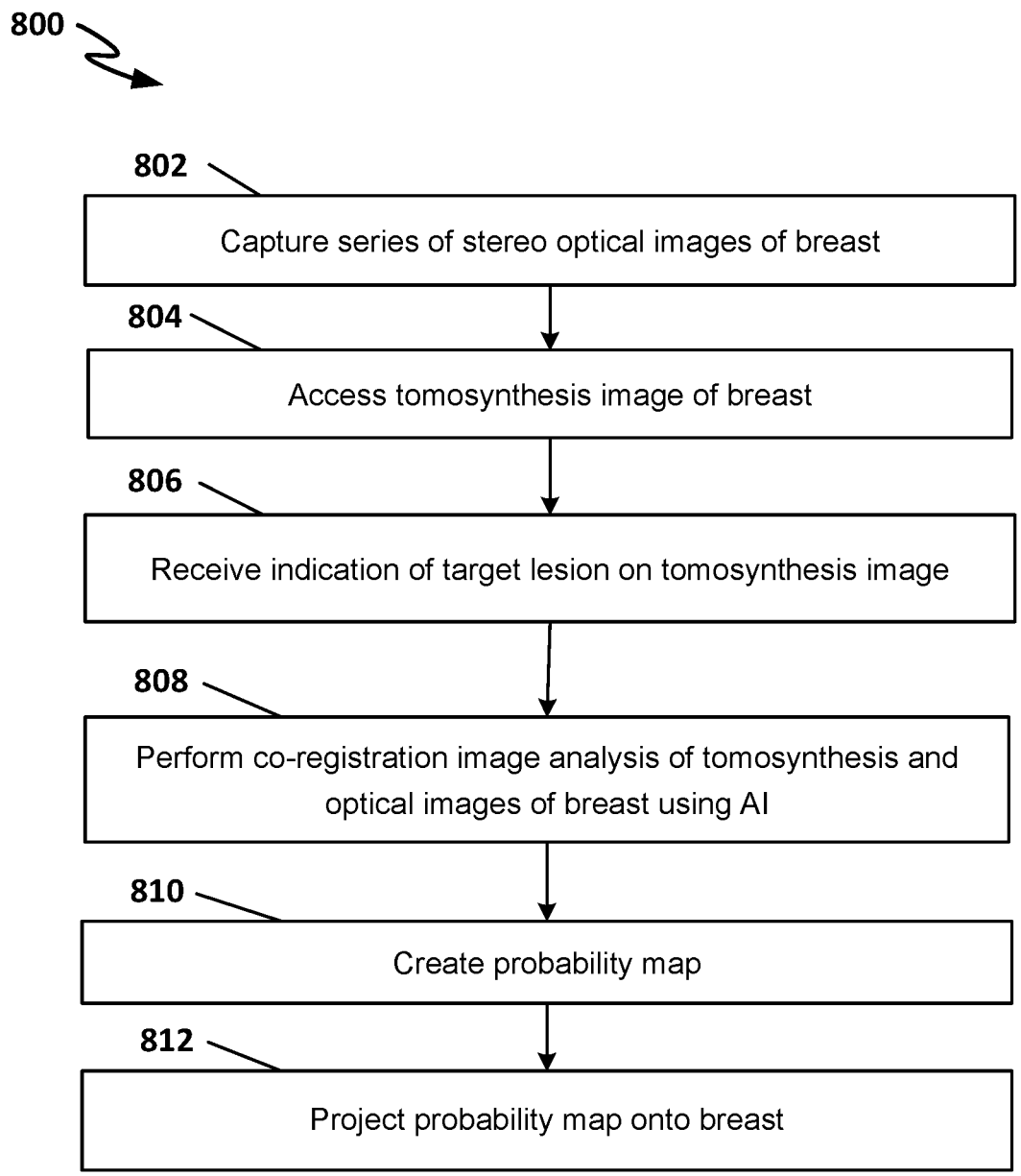
FIG. 12 is a flow diagram illustrating an example method of correlating lesions.

In some examples, as is described in FIGS. 11-12, the lesion matching engine 110 operates to generate a probability mapping. In some examples, optical cameras capture images of a breast being examined by ultrasound. Previously obtained x-ray images of the breast are accessed and analyzed using co-registration techniques and artificial intelligence region matching. The probability mapping generated from the analysis is visually projected onto the breast to aid a healthcare practitioner H in finding a target lesion. An example GUI 130 including a probability mapping is shown in FIG. 11.

Figure 2:
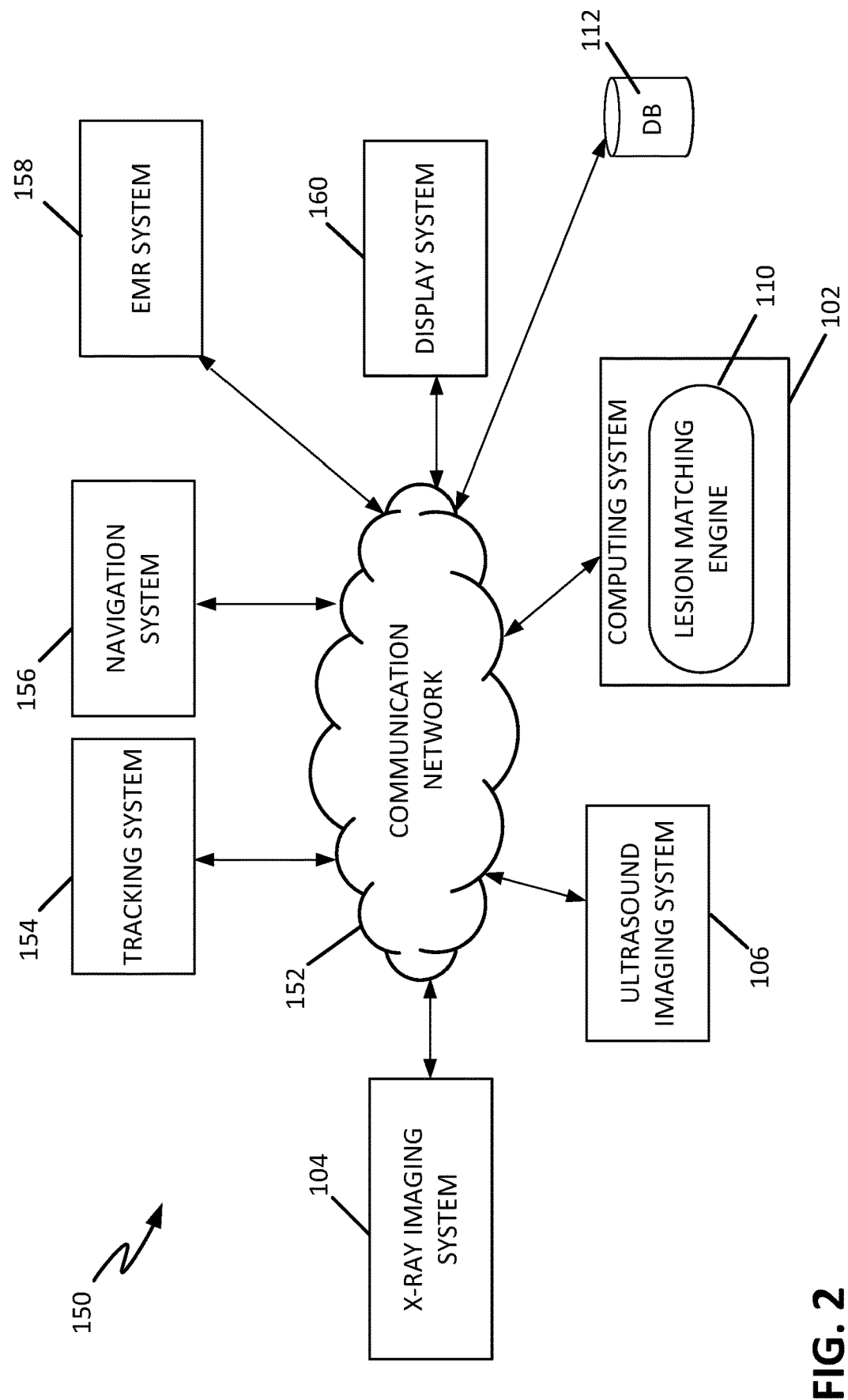
FIG. 2 illustrates a schematic diagram of an example system for managing healthcare data including imaging data.

FIG. 2 illustrates a schematic diagram of an example system 150 for managing healthcare data including imaging data. The system 150 includes multiple computing components in communication with one another through a communication network 152. The computing components can include a tracking system 154, a navigation system 156, an EMR system 158, and a display system 160 in addition to the computing system 102, x-ray imaging system 104, and ultrasound imaging system 106 described in FIG. 1.

It should be noted that, although the 'systems' are shown in FIG. 1 as functional blocks, different systems may be integrated into a common device, and the communication link may be coupled between fewer than all of the systems; for example, the tracking system 154, navigation system 156 and display system 160 may be included in an acquisition work station or a technologist work station which may control the acquisition of the images in a radiology suite. Alternatively, the navigation system 156 and tracking system 154 may be integrated into the ultrasound imaging system 106, or provided as standalone modules with separate communication links to the display 160, x-ray imaging system 104 and ultrasound imaging system 106. Similarly, skilled persons will additionally appreciate that communication network 152 can be a local area network, wide area network, wireless network, internet, intranet, or other similar communication network.

In one example, the x-ray imaging system 104 is a tomosynthesis acquisition system which captures a set of projection images of a patient's breast as an x-ray tube scans across a path over the breast. The set of projection images is subsequently reconstructed to a three-dimensional volume which may be viewed as slices or slabs along any plane. The three-dimensional volume may be stored locally at the x-ray imaging system 104 (either on the x-ray imaging device 114 or on the x-ray computing device 116) or at a data store such as the data store 112 in communication with the x-ray imaging system 104 through the communication network 152. In some examples, the three-dimensional volume could be stored in a patient's file within an electronic medical record (EMR) system 158. Additional details regarding an example x-ray imaging system are described in reference to FIGS. 3-5.

The x-ray imaging system 104 may transmit the three-dimensional x-ray image volume to a navigation system 156 via the communication network 152, where such x-ray image can be stored and viewed. The navigation system 156 displays the x-ray image obtained by the x-ray imaging system. Once reconstructed for display on navigation system 156 the x-ray image can be reformatted and repositioned to view the image at any plane and any slice position or orientation. In some examples, the navigation system 156 displays multiple frames or windows on the same screen showing alternative positions or orientations of the x-ray-image slice.

Skilled persons will understand that the x-ray image volume obtained by x-ray imaging system 104 can be transmitted to navigation system 156 at any point in time and is not necessarily transmitted immediately after obtaining the x-ray image volume, but instead can be transmitted on the request of navigation system 156. In alternative examples, the x-ray image volume is transmitted to navigation system 156 by a transportable media device, such as a flash drive, CD-ROM, diskette, or other such transportable media device.

The ultrasound imaging system 106 obtains an ultrasound image of a tissue of a patient, typically using an ultrasound probe, which is used to image a portion of a tissue of a patient within the field of view of the ultrasound probe. For instance, the ultrasound imaging system 106 may be used to image a breast. The ultrasound imaging system 106 obtains and displays an ultrasound image of a patient's anatomy within the field of view of the ultrasound probe and typically displays the image in real-time as the patient is being imaged. In some examples, the ultrasound image can additionally be stored on a storage medium, such as a hard drive, CD-ROM, flash drive or diskette, for reconstruction or playback at a later time. Additional details regarding the ultrasound imaging system are described in reference to FIGS. 6-7.

In some examples, the navigation system 156 can access the ultrasound image, and in such examples the ultrasound imaging system 106 is further connected to the communication network 152 and a copy of the ultrasound image obtained by the ultrasound imaging system 106 can be transmitted to the navigation system 156 via communication network 152. In other examples, the navigation system 156 can remotely access and copy the ultrasound image via the communication network 152. In alternative examples, a copy of the ultrasound image can be stored on the data store 112 or EMR system 158 in communication with the navigation system 156 via the communication network 152 and accessed remotely by the navigation system 156.

The tracking system 154 is in communication with the navigation system 156 via the communications network 152 and may track the physical position in which the ultrasound imaging system 106 is imaging the tissue of the patient. In some examples, the tracking system 154 can be connected directly to the navigation system 156 via a direct communication link or wireless communication link. The tracking system 154 tracks the position of transmitters connected to ultrasound imaging system 106 and provides the navigation system 156 with data representing their coordinates in a tracker coordinate space. In some examples, the tracking system 154 may be an optical tracking system comprising an optical camera and optical transmitters, however skilled persons will understand that any device or system capable of tracking the position of an object in space can be used. For example, skilled persons will understand that in some examples a radio frequency (RF) tracking system can be used, comprising an RF receiver and RF transmitters.

The ultrasound imaging system 106 may be configured for use with the navigation system 156 by a calibration process using the tracking system 154. Transmitters that are connected to the ultrasound probe of ultrasound imaging system 106 may transmit their position to tracking system 154 in the tracker coordinate space, which in turn provides this information to navigation system 156. For example, transmitters may be positioned on the probe of the ultrasound imaging system 106 so that the tracking system 154 can monitor the position and orientation of the ultrasound probe and provide this information to the navigation system 156 in the tracker coordinate space. The navigation system 156 may use this tracked position to determine the position and orientation of the ultrasound probe, relative to the tracked position of the transmitters. In some examples, the navigation system 156 and tracking system 154 operate to provide real time guidance to a healthcare practitioner H performing ultrasound imaging of a patient P.

In some examples, configuration occurs using a configuration tool. In such examples, the position and orientation of the configuration tool may be additionally tracked by tracking system 154. During configuration the configuration tool contacts the transducer face of the ultrasound probe of the ultrasound imaging system 106 and the tracking system 154 transmits information representing the position and orientation of the configuration tool in the tracker coordinate space to the navigation system 156. The navigation system 156 may determine a configuration matrix that can be used to determine the position and orientation of the field of view of the ultrasound probe in the tracker coordinate space, based on the tracked position of the transmitters connected to the ultrasound probe. In alternative examples, a database having configuration data of a plurality of brands or models of various ultrasound probes can be used to pre-load a field of view configuration into the navigation system 156 during configuration.

Once the ultrasound imaging system 106 is configured with the navigation system 156, the tissue of a patient can be imaged with ultrasound imaging system 106. During ultrasound imaging, the tracking system 154 monitors the position and orientation of the ultrasound probe of the ultrasound imaging system 106 and provides this information in the tracker coordinate space to the navigation system 156. Since the ultrasound imaging system 106 has been configured for use with the navigation system 156, the navigation system 156 is able to determine position and orientation of the field of view of the ultrasound probe of the ultrasound imaging system 106.

The navigation system 156 can be configured to co-register an ultrasound image with an x-ray image. In some examples, the navigation system 156 can be configured to transform the position and orientation of the field of view of the ultrasound probe from the tracker coordinate space to a position and orientation in the x-ray image, for example, to x-ray system coordinates. This can be accomplished by tracking the position and orientation of the ultrasound probe and transmitting this positional information in the tracker coordinate space to navigation system 156 and relating this positional information to the x-ray coordinate system. In some examples, the co-registered images are displayed on the GUI 130.

For example, a user can select an anatomical plane within the x-ray image, and the user can then manipulate the position and orientation of a tracked ultrasound probe to align the field of view of the ultrasound probe with the selected anatomical plane. Once alignment is achieved, the associated tracker space coordinates of the ultrasound image can be captured. Registration of the anatomic axes (superior-inferior (SI), left-right (LR) and anterior-posterior (AP)) between the x-ray image and the tracker coordinate space can be determined from the relative rotational differences between the tracked ultrasound field of view orientation and the selected anatomical plane using techniques known to those of skill in the art.

This configuration may further include the selection of landmarks within the x-ray image, for example, using an interface permitting a user to select an anatomical target. In some examples, the landmark can be an internal tissue landmark, such as veins or arteries, and in other examples, the landmark can be an external landmark, such as a fiducial skin marker or external landmark, such as a nipple. The same landmark selected in the x-ray image can be located with the ultrasound probe, and upon location, a mechanism can be provided for capturing coordinates of the representation of the target in the tracker coordinate space. The relative differences between the coordinates of the target in the x-ray image and the coordinates of the target in the tracker coordinate space are used to determine the translational parameters required to align the two co-ordinate spaces. The plane orientation information acquired previously can be combined with the translation parameters to provide a complete 4×4 transformation matrix capable of co-registering the two coordinate spaces.

The navigation system 156 can then use the transformation matrix to reformat the x-ray image being displayed so that the slice of tissue being displayed is in the same plane and in the same orientation as the field of view of the ultrasound probe of the ultrasound imaging system 106. Matched ultrasound and x-ray images may then be displayed side by side, or directly overlaid in a single image viewing frame. In some examples, the navigation system 156 can display additional x-ray images in separate frames or positions on a display screen. For example, the x-ray image can be displayed with a graphical representation of the field of view of the ultrasound imaging system 106 wherein the graphical representation of the field of view is shown slicing through a 3D representation of the x-ray image. In other examples annotations can be additionally displayed, these annotations representing, for example, the position of instruments imaged by the ultrasound imaging system 106, such as biopsy needles, guidance wires, imaging probes or other similar devices.

In other examples, the ultrasound image being displayed by the ultrasound imaging system 106 can be superimposed on the slice of the x-ray image being displayed by the navigation system 156 so that a user can view both the x-ray and ultrasound images simultaneously, overlaid on the same display. In some examples, the navigation system 156 can enhance certain aspects of the super imposed ultrasound or x-ray images to increase the quality of the resulting combined image.

As described in FIG. 1, the computing system 102 operating a lesion matching engine 110 analyzes sets of x-ray images and ultrasound images to determine a confidence level that a lesion identified in an ultrasound image is the same lesion that was identified in an x-ray image. A confidence level indicator can be displayed on a computing device to aid a user operating the ultrasound imaging system 106 in determining whether a previously identified lesion in an x-ray image has been found in a corresponding ultrasound image.

The electronic medical record system 158 stores a plurality of electronic medical records (EMRs). Each EMR contains the medical and treatment history of a patient. Examples of electronic medical records systems 158 include those developed and managed by Epic Systems Corporation, Cerner Corporation, Allscripts, and Medical Information Technology, Inc. (Meditech).

Figure 3:
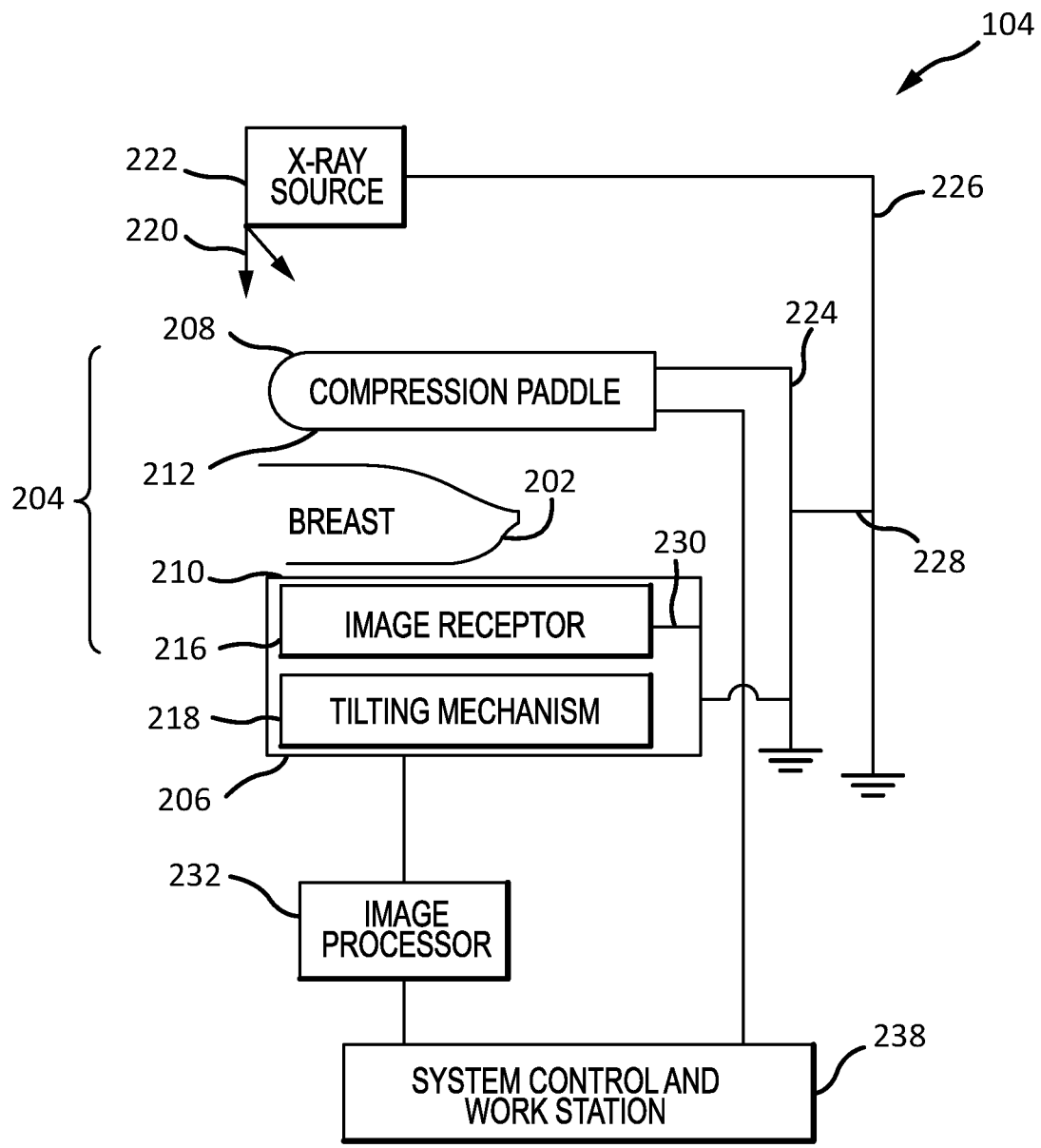
FIG. 3 is a schematic view of an exemplary x-ray imaging system.
Figure 4:
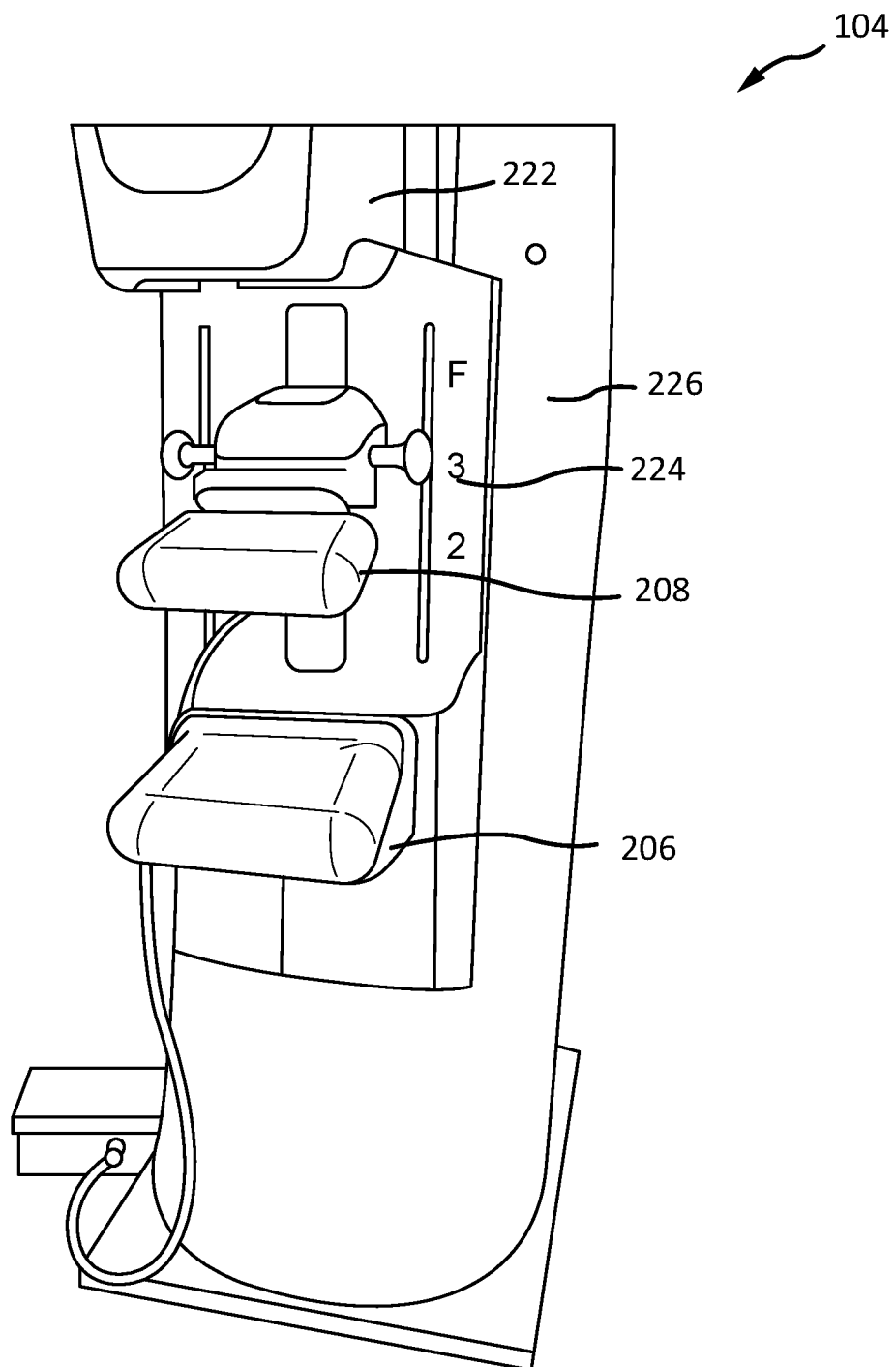
FIG. 4 is a perspective view of the x-ray imaging system of FIG. 3.

FIG. 3 is a schematic view of an exemplary x-ray imaging system 104. FIG. 4 is a perspective view of the x-ray imaging system 104. Referring concurrently to FIGS. 3 and 4, the x-ray imaging system 104 immobilizes a patient's breast 202 for x-ray imaging (either or both of mammography and tomosynthesis) via a breast compression immobilizer unit 204 that includes a static breast support platform 206 and a moveable compression paddle 208. The breast support platform 206 and the compression paddle 208 each have a compression surface 210 and 212, respectively, that move towards each other to compress and immobilize the breast 202. In known systems, the compression surface 210, 212 is exposed so as to directly contact the breast 202. The platform 206 also houses an image receptor 216 and, optionally, a tilting mechanism 218, and optionally an anti-scatter grid. The immobilizer unit 204 is in a path of an imaging beam 220 emanating from x-ray source 222, such that the beam 220 impinges on the image receptor 216.

The immobilizer unit 204 is supported on a first support arm 224 and the x-ray source 222 is supported on a second support arm 226. For mammography, support arms 224 and 226 can rotate as a unit about an axis 228 between different imaging orientations such as CC and MLO, so that the system 104 can take a mammogram projection image at each orientation. In operation, the image receptor 216 remains in place relative to the platform 206 while an image is taken. The immobilizer unit 204 releases the breast 202 for movement of arms 224, 226 to a different imaging orientation. For tomosynthesis, the support arm 224 stays in place, with the breast 202 immobilized and remaining in place, while at least the second support arm 226 rotates the x-ray source 222 relative to the immobilizer unit 204 and the compressed breast 202 about the axis 228. The system 104 takes plural tomosynthesis projection images of the breast 202 at respective angles of the beam 220 relative to the breast 202.

Concurrently and optionally, the image receptor 216 may be tilted relative to the breast support platform 206 and in sync with the rotation of the second support arm 226. The tilting can be through the same angle as the rotation of the x-ray source 222, but may also be through a different angle selected such that the beam 220 remains substantially in the same position on the image receptor 216 for each of the plural images. The tilting can be about an axis 230, which can but need not be in the image plane of the image receptor 216. The tilting mechanism 218 that is coupled to the image receptor 216 can drive the image receptor 216 in a tilting motion.

For tomosynthesis imaging and/or CT imaging, the breast support platform 206 can be horizontal or can be at an angle to the horizontal, e.g., at an orientation similar to that for conventional MLO imaging in mammography. The x-ray imaging system 104 can be solely a mammography system, a CT system, or solely a tomosynthesis system, or a "combo" system that can perform multiple forms of imaging. An example of such a combo system has been offered by the assignee hereof under the trade name Selenia Dimensions. In some examples, initial imaging is performed with magnetic resonance imaging (MRI).

When the system is operated, the image receptor 216 produces imaging information in response to illumination by the imaging beam 220, and supplies it to an image processor 232 for processing and generating breast x-ray images. A system control and work station unit 238 including software controls the operation of the system and interacts with the operator to receive commands and deliver information including processed-ray images.

Figure 5:
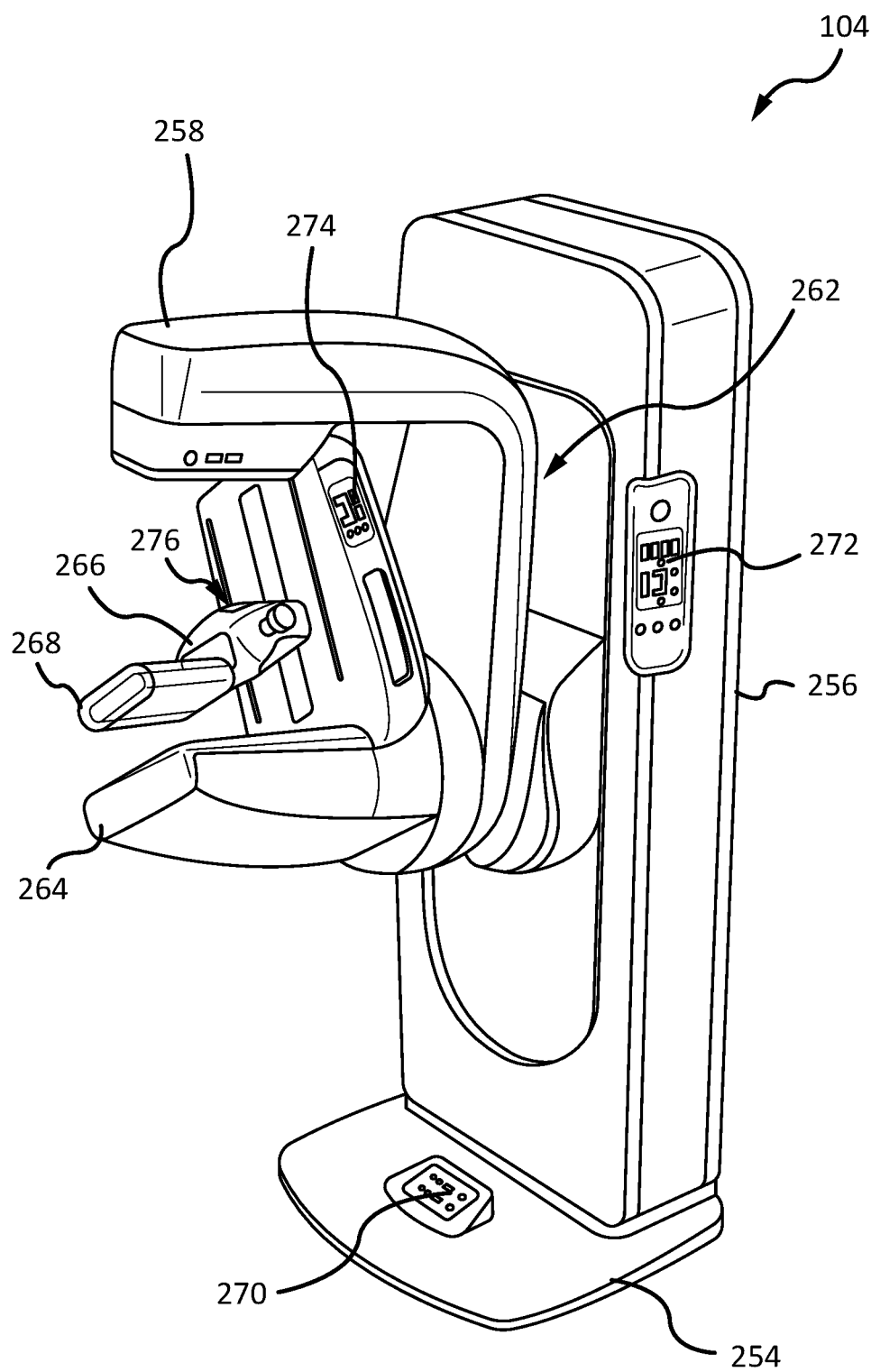
FIG. 5 depicts the x-ray imaging system in a breast positioning state for left mediolateral oblique (LMLO) imaging orientation.

FIG. 5 depicts an exemplary x-ray imaging system 104 in a breast positioning state for left mediolateral oblique MLO (LMLO) imaging orientation. A tube head 258 of the system 104 is set in an orientation so as to be generally parallel to a gantry 256 of the system 104, or otherwise not normal to the flat portion of a support arm 260 against which the breast is placed. In this position, the technologist may more easily position the breast without having to duck or crouch below the tube head 258.

The x-ray imaging system 104 includes a floor mount or base 254 for supporting the x-ray imaging system 104 on a floor. The gantry 256 extends upwards from the floor mount 252 and rotatably supports both the tube head 258 and a support arm 260. The tube head 258 and support arm 260 are configured to rotate discretely from each other and may also be raised and lowered along a face 262 of the gantry so as to accommodate patients of different heights. An x-ray source, described elsewhere herein and not shown here, is disposed within the tube head 258. The support arm 260 includes a support platform 264 that includes therein an x-ray receptor and other components (not shown). A compression arm 266 extends from the support arm 260 and is configured to raise and lower linearly (relative to the support arm 260) a compression paddle 268 for compression of a patient breast during imaging procedures. Together, the tube head 258 and support arm 260 may be referred to as a C-arm.

A number of interfaces and display screens are disposed on the x-ray imaging system 104. These include a foot display screen 270, a gantry interface 272, a support arm interface 274, and a compression arm interface 276. In general the various interfaces 272, 274, and 276 may include one or more tactile buttons, knobs, switches, as well as one or more display screens, including capacitive touch screens with graphic user interfaces (GUIs) so as to enable user interaction with and control of the x-ray imaging system 104. In examples, the interfaces 272, 274, 276 may include control functionality that may also be available on a system control and work station, such as the x-ray computing device 116 of FIG. 1. Any individual interface 272, 274, 276 may include functionality available on other interfaces 272, 274, 276, either continually or selectively, based at least in part on predetermined settings, user preferences, or operational requirements. In general, and as described below, the foot display screen 270 is primarily a display screen, though a capacitive touch screen might be utilized if required or desired.

In examples, the gantry interface 272 may enable functionality such as: selection of the imaging orientation, display of patient information, adjustment of the support arm elevation or support arm angles (tilt or rotation), safety features, etc. In examples, the support arm interface 274 may enable functionality such as adjustment of the support arm elevation or support arm angles (tilt or rotation), adjustment of the compression arm elevation, safety features, etc. In examples, the compression arm interface 276 may enable functionality such as adjustment of the compression arm elevation, safety features, etc. Further, one or more displays associated with the compression arm interface 276 may display more detailed information such as compression arm force applied, imaging orientation selected, patient information, support arm elevation or angle settings, etc. The foot display screen 270 may also display information such as displayed by the display(s) of the compression arm interface 276, or additional or different information, as required or desired for a particular application.

Figure 6:
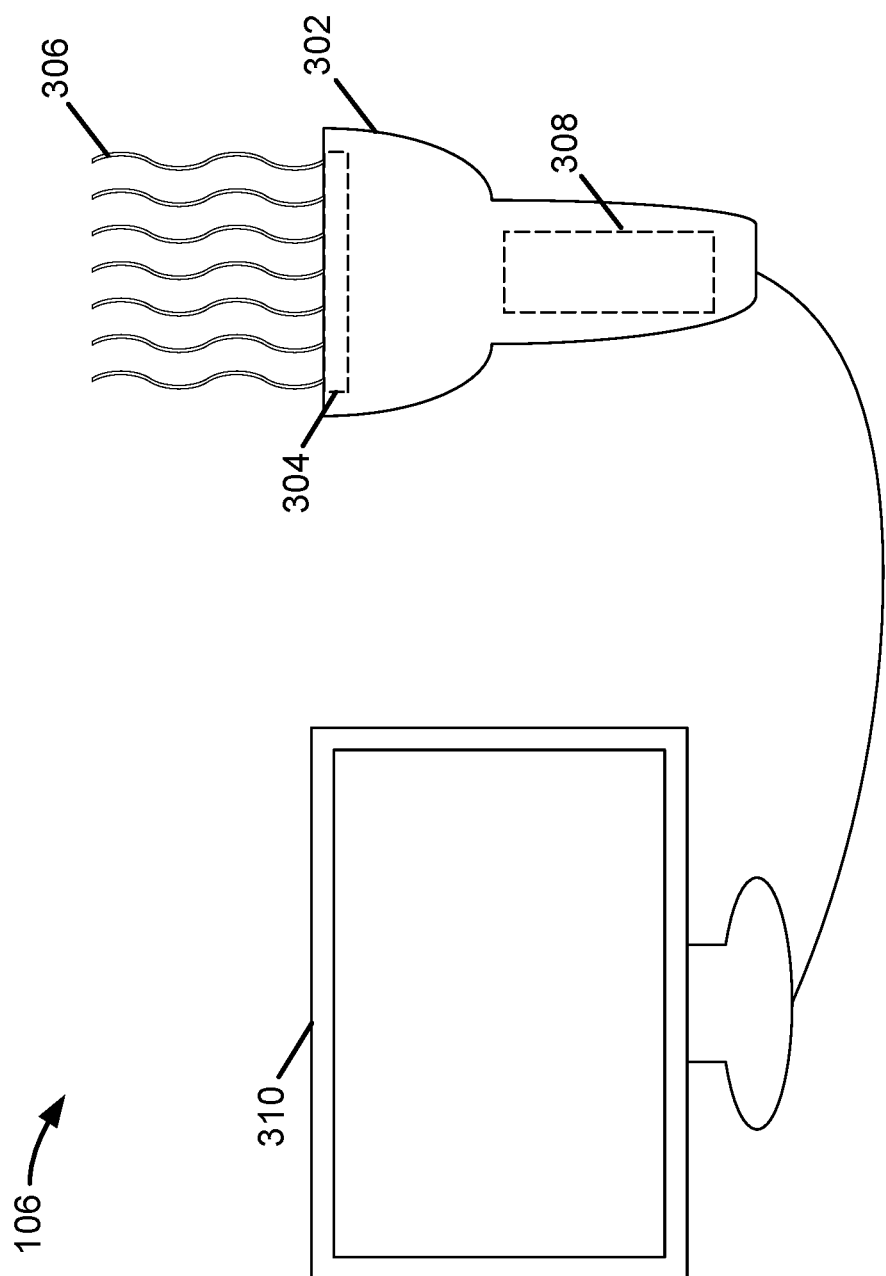
FIG. 6 depicts an example ultrasound imaging system.

FIG. 6 depicts an example of an ultrasound imaging system 106. The ultrasound imaging system 106 includes an ultrasound probe 302 that includes an ultrasonic transducer 304. The ultrasonic transducer 304 is configured to emit an array of ultrasonic sound waves 306. The ultrasonic transducer 304 converts an electrical signal into ultrasonic sound waves 306. The ultrasonic transducer 304 may also be configured to detect ultrasonic sound waves, such as ultrasonic sound waves that have been reflected from internal portions of a patient, such as lesions within a breast. In some examples, the ultrasonic transducer 304 may incorporate a capacitive transducer and/or a piezoelectric transducer, as well as other suitable transducing technology.

The ultrasonic transducer 304 is also operatively connected (e.g., wired or wirelessly) to a display 310. The display 310 may be a part of a computing system, such as the ultrasound computing device 118 of FIG. 2, which includes processors and memory configured to produce and analyze ultrasound images. The display 310 is configured to display ultrasound images based on an ultrasound imaging of a patient.

The ultrasound imaging performed in the ultrasound imaging system 106 is primarily B-mode imaging, which results in a two-dimensional ultrasound image of a cross-section of a portion of the interior of a patient. The brightness of the pixels in the resultant image generally corresponds to amplitude or strength of the reflected ultrasound waves.

Other ultrasound imaging modes may also be utilized. For example, the ultrasound probe may operate in a 3D ultrasound mode that acquires ultrasound image data from a plurality of angles relative to the breast to build a 3D model of the breast.

In some examples, ultrasound images may not be displayed during the acquisition process. Rather, the ultrasound data is acquired and a 3D model of the breast is generated without B-mode images being displayed.

The ultrasound probe 302 may also include a probe localization transceiver 308. The probe localization transceiver 308 is a transceiver that emits a signal providing localization information for the ultrasound probe 302. The probe localization transceiver 308 may include a radio frequency identification (RFID) chip or device for sending and receiving information as well as accelerometers, gyroscopic devices, or other sensors that are able to provide orientation information. For instance, the signal emitted by the probe localization transceiver 308 may be processed to determine the orientation or location of the ultrasound probe 302. The orientation and location of the ultrasound probe 302 may be determined or provided in three-dimensional components, such as Cartesian coordinates or spherical coordinates. The orientation and location of the ultrasound probe 302 may also be determined or provided relative to other items, such as an incision instrument, a marker, a magnetic direction, a normal to gravity, etc. With the orientation and location of the ultrasound probe 302, additional information can be generated and provided to the surgeon to assist in guiding the surgeon to a lesion within the patient, as described further below. While the term transceiver is used herein, the term is intended to cover both transmitters, receivers, and transceivers, along with any combination thereof.

Figure 7:
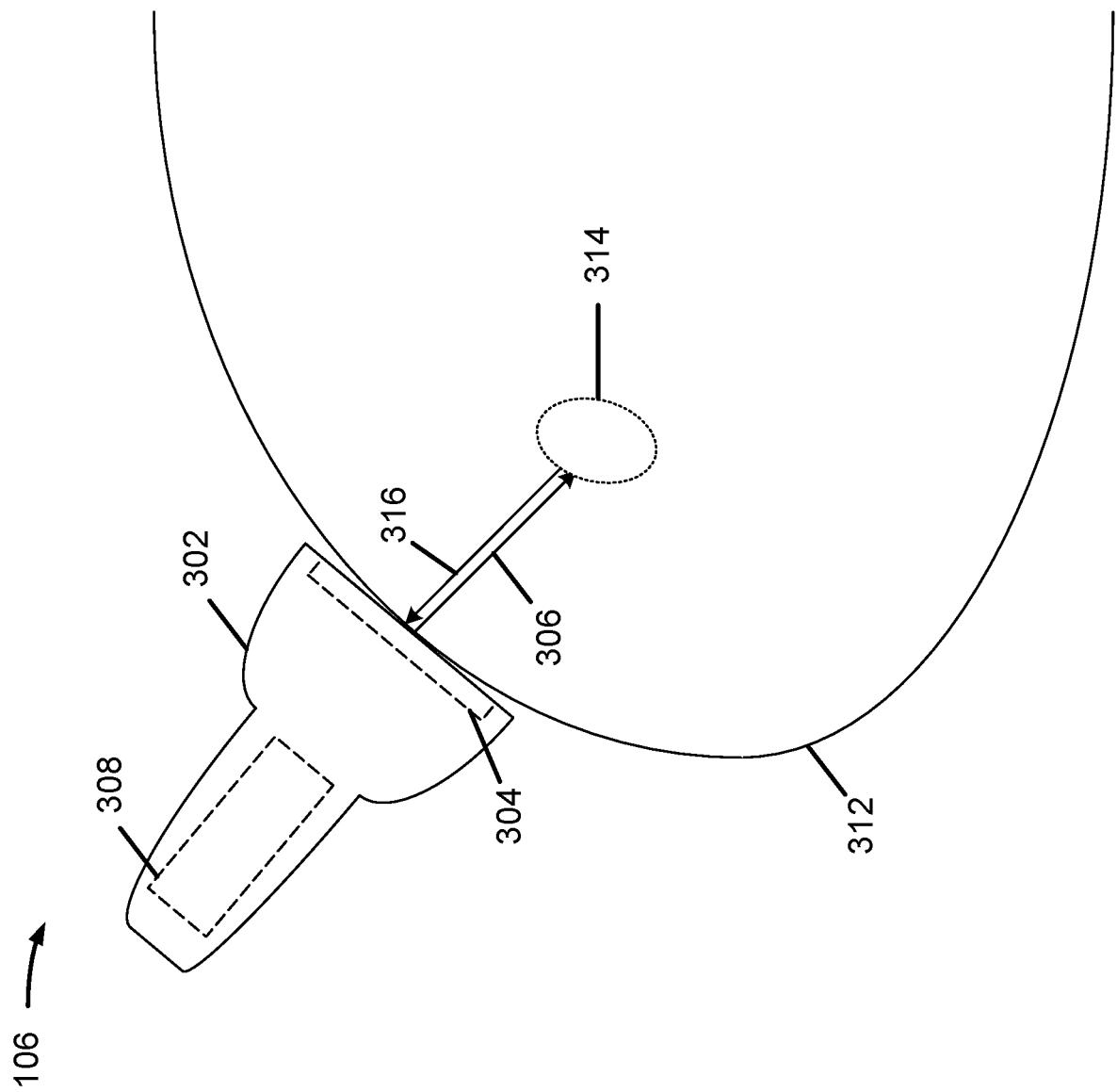
FIG. 7 depicts an example of the ultrasound imaging system of FIG. 6 in use with a breast of a patient.

FIG. 7 depicts an example of the ultrasound imaging system 106 in use with a breast 312 of a patient. The ultrasound probe 302 is in contact with a portion of the breast 312. In the position depicted in FIG. 7, the ultrasound probe 302 is being used to image a lesion 314 of the breast 312. To image the lesion 314, the ultrasonic transducer 304 emits an array of ultrasonic sound waves 306 into the interior of the breast 312. A portion of the ultrasonic sound waves 306 are reflected off internal components of the breast, such as the lesion 314 when the lesion is in the field of view, and return to the ultrasound probe 302 as reflected ultrasonic sound waves 316. The reflected ultrasonic sound waves 316 may be detected by the ultrasonic transducer 304. For instance, the ultrasonic transducer 304 receives the reflected ultrasonic sound waves 316 and converts the reflected ultrasonic sound waves 316 into an electric signal that can be processed and analyzed to generate ultrasound image data on display 310.

The depth of the lesion 314 or other objects in an imaging plane may be determined from the time between a pulse of ultrasonic waves 306 being emitted from the ultrasound prove 302 and the reflected ultrasonic waves 316 being detected by the ultrasound probe 302. For instance, the speed of sound is well-known and the effects of the speed of sound based on soft tissue are also determinable. Accordingly, based on the time of flight of the ultrasonic waves 306 (more specifically, half the time of flight), the depth of the object within an ultrasound image may be determined. Other corrections or methods for determining object depth, such as compensating for refraction and variant speed of waves through tissue, may also be implemented. Those having skill in the art will understand further details of depth measurements in medical ultrasound imaging technology. Such depth measurements and determinations may be used to build a 3D model of the breast 312.

In addition, multiple frequencies or modes of ultrasound techniques may be utilized. For instance, real time and concurrent transmit and receive multiplexing of localization frequencies as well as imaging frequencies and capture frequencies may be implemented. Utilization of these capabilities provide information to co-register or fuse multiple data sets from the ultrasound techniques to allow for visualization of lesions and other medical images on the display 310. The imaging frequencies and capture sequences may include B-mode imaging (with or without compounding), Doppler modes (e.g., color, duplex), harmonic mode, shear-wave and other elastography modes, and contrast-enhanced ultrasound, among other imaging modes and techniques.

Figure 8:
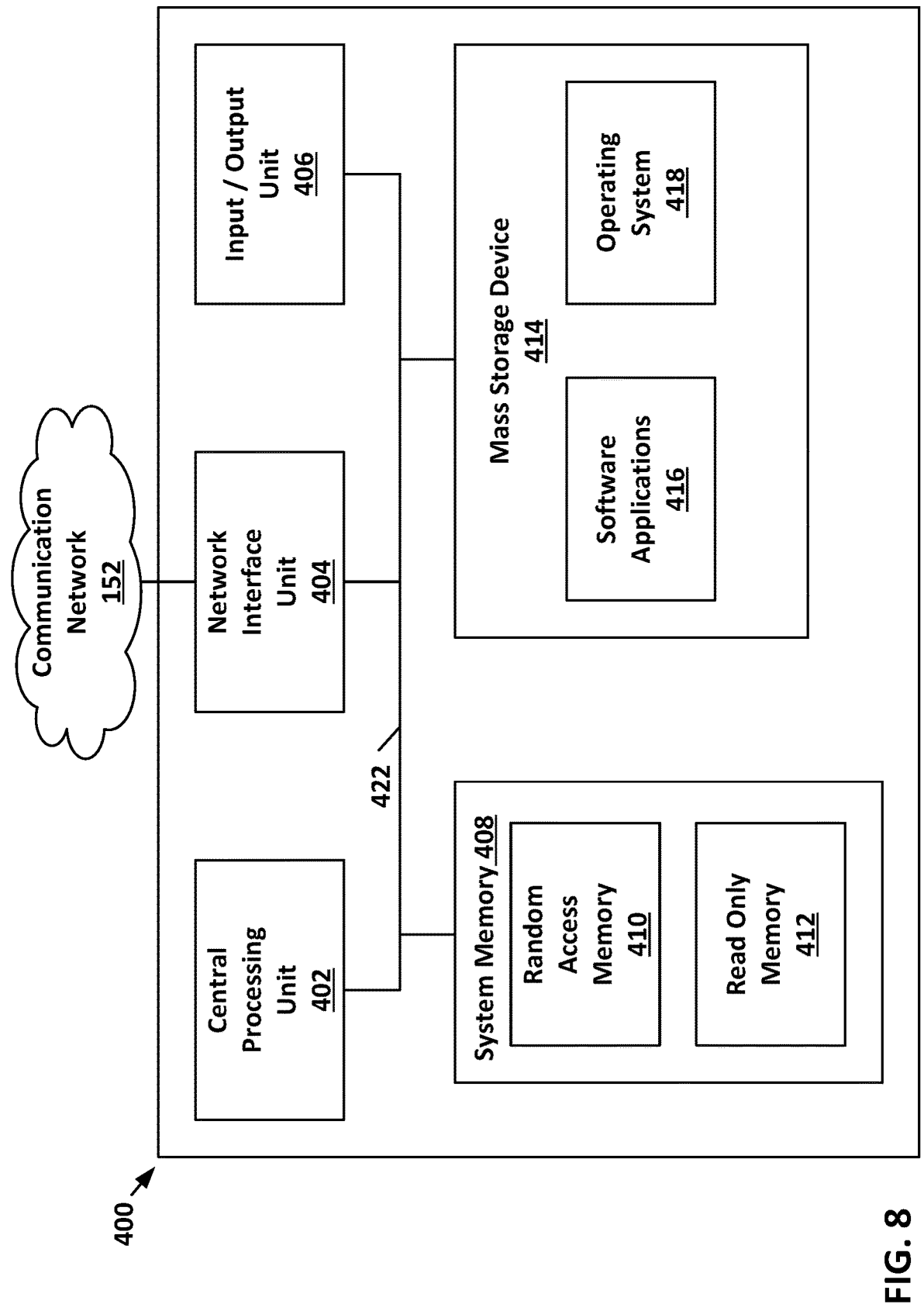
FIG. 8 is a schematic diagram of an exemplary computing system usable to implement one or more aspects of the present disclosure.

FIG. 8 is a block diagram illustrating an example of the physical components of a computing device 400. The computing device 400 could be any computing device utilized in conjunction with the lesion identification system 100 or the system 150 for managing imaging data such as the computing system 102, x-ray computing device 116, and ultrasound computing device 118.

In the example shown in FIG. 8, the computing device 400 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the computing device 400, such as during startup, is stored in the ROM 412. The computing system 400 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the computing device 400. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain examples, the computer-readable storage media includes entirely non-transitory media.

Computer-readable storage media include volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the computing device 400.

According to some examples, the computing device 400 can operate in a networked environment using logical connections to remote network devices through a network 152, such as a wireless network, the Internet, or another type of network. The computing device 400 may connect to the network 152 through a network interface unit 404 connected to the system bus 422. It should be appreciated that the network interface unit 404 may also be utilized to connect to other types of networks and remote computing systems. The computing device 400 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the computing device 400 can store software instructions and data. The software instructions include an operating system 418 suitable for controlling the operation of the computing device 400. The mass storage device 414 and/or the RAM 410 also store software instructions, that when executed by the CPU 402, cause the computing device 400 to provide the functionality discussed in this document.

Figure 9:
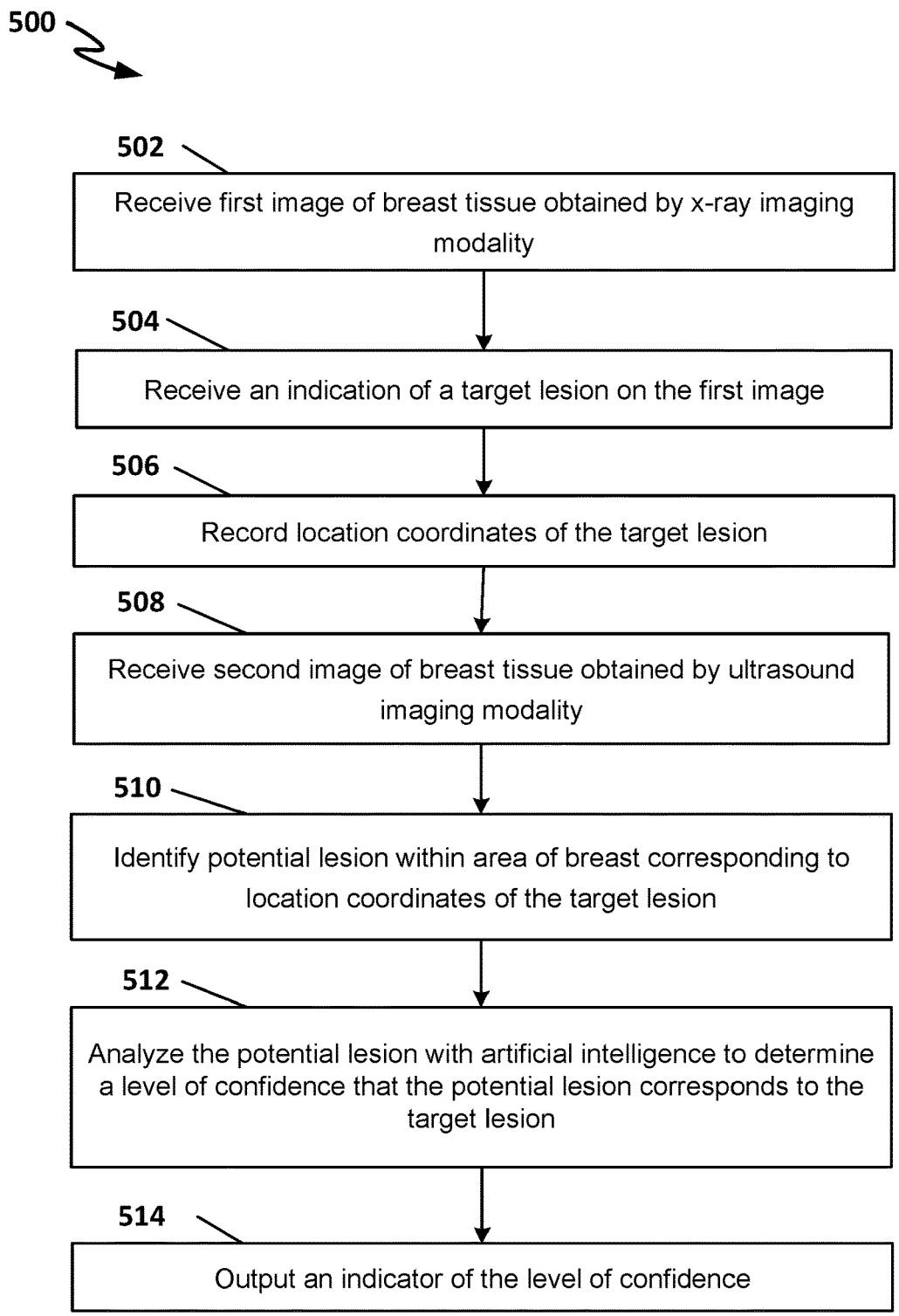
FIG. 9 is a flow diagram illustrating an example method of identifying a region of interest within a breast.

Referring now to FIG. 9, an example method 500 of locating a region of interest within a breast is described. In some examples, the systems and devices described in FIGS. 1-8 are usable to implement the method 500. In particular, the computing system 102 of FIGS. 1-2 operates to implement the steps of the method 500 to aid a healthcare provider in locating a region of interest within a breast during an imaging procedure.

At operation 502, a first image obtained by an x-ray imaging modality is received. In some examples, the x-ray imaging device 114 of the x-ray imaging system 104 of FIGS. 1-2 operates to record the x-ray image as the result of inputs provided by a healthcare provider H at an x-ray computing device 116. In some examples, the x-ray image is acquired using digital breast tomosynthesis. In some examples, the x-ray image could be obtained from a remote data store. In such examples, the x-ray image may be have recorded at a different time and place and then stored in an EMR or other data store. In some examples, the first image is received at the computing system 102.

At operation 504, an indication of a target lesion on the x-ray image is received. In some examples, the indication is received from the healthcare provider H at the x-ray computing device 116. The computing device 116 may operate to display a user interface that allows the healthcare provider H to easily interact with x-ray images to highlight a target lesion by means of inputs provided with an input device in communication with the x-ray computing device 116 such as a mouse, a touchscreen, or a stylus. In some examples, the target lesion can be indicated with a visual marker. The target lesion is identified by the healthcare provider H as requiring additional analysis. In some examples, the target lesion is later identified by a clinician after the x-ray image is taken. In some examples, target lesions can be identified in real-time as the x-ray image is being recorded using an artificial intelligence system.

At operation 506, location coordinates of the target lesion are recorded. Coordinates of the target lesion are recorded during the x-ray imaging process using the x-ray imaging system 104. In some examples, the coordinates can be Cartesian coordinates or polar coordinates. In some examples, a region of interest may be identified within a particular slice within a tomosynthesis image stack (z coordinate) and its position can be further identified by x and y coordinates within that image slice.

At operation 508, a second image of the breast tissue is obtained by ultrasound imaging. The ultrasound image includes an area of the breast tissue corresponding to the location coordinates of the target lesion. In some examples, the ultrasound imaging device 120 of the ultrasound imaging system 106 of FIGS. 1-2 operates to record the ultrasound image as the result of inputs provided by a healthcare provider H at an ultrasound computing device 118. In some examples, the ultrasound image could be obtained from a remote data store. In such examples, ultrasound image may be have recorded at a different time and place and then stored in an EMR or other data store. In some examples, the second image is received at the computing system 102 for processing with the first image.

Figure 10:
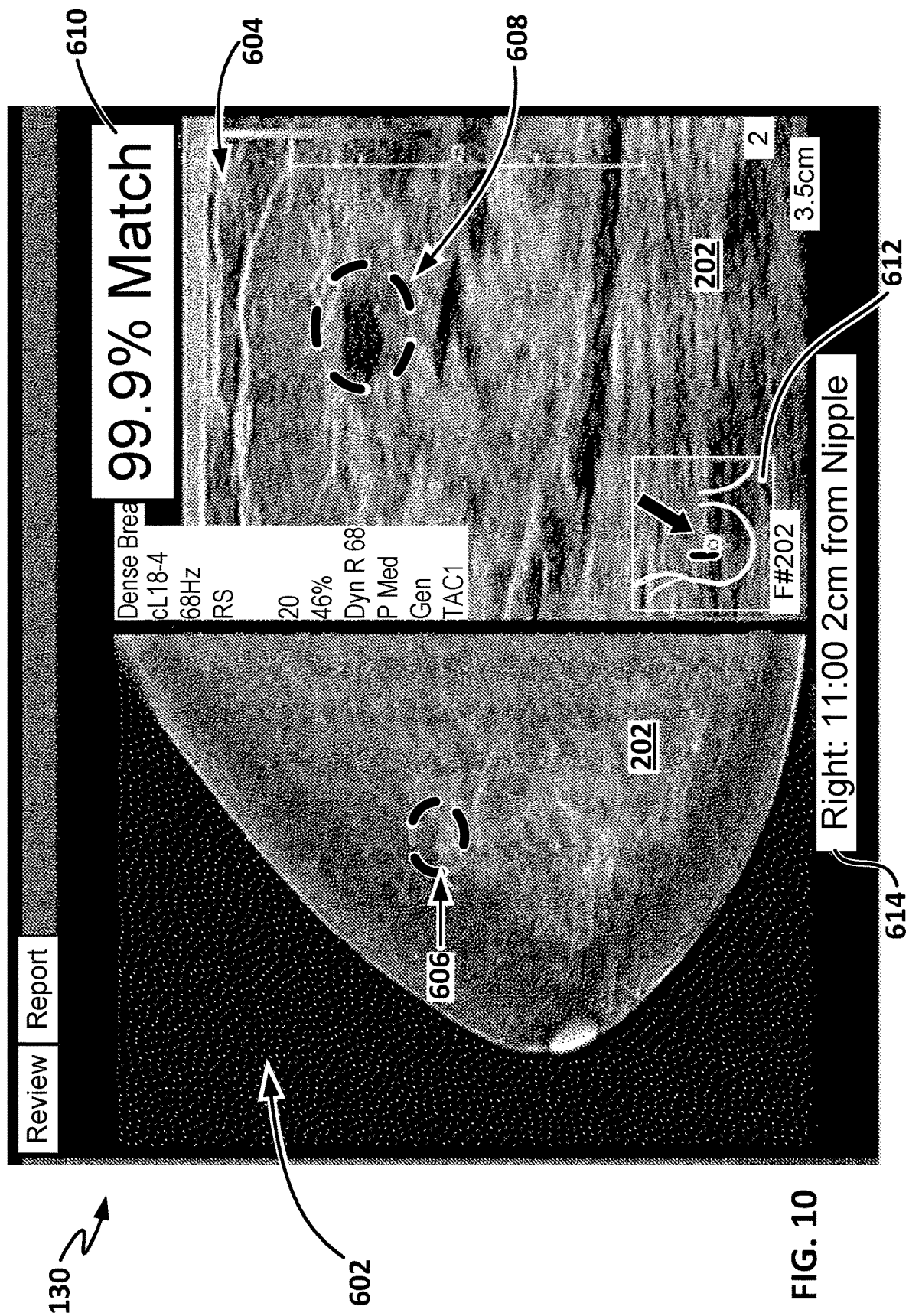
FIG. 10 illustrates an example display of the graphical user interface of FIG. 1.

At operation 510, a potential lesion is identified within the area of the breast tissue corresponding to the location coordinates of the target lesion. In some examples, the area is identified based on coordinates that were converted for ultrasound from the coordinates saved for the target lesion during x-ray imaging. In some examples, the location coordinates include at least two of a clock position relative to the nipple, a depth from the surface of the breast, and a distance from the nipple. In some examples, the potential lesion can be highlighted by a healthcare provider H at the ultrasound computing device 118. The computing device 118 may operate to display a user interface that allows the healthcare provider H to easily interact with ultrasound images to highlight a potential lesion by means of inputs provided with an input device in communication with the ultrasound computing device 118 such as a mouse, a touchscreen, or a stylus. In some embodiments, a GUI 130 displays a DBT image and an ultrasound image side by side. An example of this GUI 130 is shown in FIG. 10. The potential lesion is identified by the healthcare provider H as potentially being the same as the target lesion identified in the x-ray image. In some examples, a real-time artificial intelligence system can analyze DBT images as they are recorded to identify potential lesions. One example of such a system is described in co-pending application (insert information about matter no. 04576.0110USP1) entitled "Real-time AI for Physical Biopsy Marker Detection," which is hereby incorporated by reference in its entirety.

At operation 512, the potential lesion is analyzed using artificial intelligence to determine a level of confidence that the potential lesion in the second image corresponds to the target lesion in the first image. In some examples, the lesion matching engine 110 operates to analyze the potential lesion and target lesion to determine if the two lesions match. As is described above, a machine learning lesion classifier analyzes various aspects of the lesions such as size, shape, and texture to match ultrasound images and x-ray images of lesions. In some examples, stiffness and density can also be compared to determine a match.

At operation 514, an indicator of the level of confidence is output. In some examples, a confidence level indicator is generated on the GUI 130. In some examples, the GUI 130 includes ultrasound images and x-ray images along with the confidence level indicator. In some examples, the indicator could be displayed as text, graphics, colors, or symbols. More details regarding an example of the GUI 130 are provided in FIG. 10.

FIG. 10 shows an example of the GUI 130 of FIG. 1. In some examples, the GUI 130 is displayed on a computing device such as the ultrasound computing device 118 of FIG. 1. In the example of FIG. 10, the GUI 130 displays an x-ray image 602 and an ultrasound image 604 of a breast 202 side-by-side. A target lesion 606 previously identified during x-ray imaging is indicated in the x-ray image 602 with a visual marker. The corresponding ultrasound image 604 of the breast 202 shows an indication of a potential lesion 608. A confidence level indicator 610 is displayed providing the likelihood that the target lesion 606 and potential lesion 608 are a match as a percentage. In this example, there is a 99.9% match.

In some examples, other indicators of the confidence level could be provided such as a colored circle around the potential lesion 608. Different colors could represent different levels of confidence. For example, a high level of confidence could be indicated with a green circle. A medium level of confidence could be indicated with a yellow circle. A low level of confidence could be indicated with a red circle. In some examples, both a visual indicator on the ultrasound image 604 and a text confidence level indicator 610 could be used.

The GUI 130 also includes a diagram 612 indicating the location on the breast 202 where the ultrasound image 604 is being taken as well as an arrow indicating the location of the target lesion 606. Additionally, coordinates 614 are displayed. In this example, the coordinates 614 indicate the location of a potential lesion in the right breast at the 11:00 clock position, 2 cm from the nipple. The diagram 612 shows a corresponding visual representation of the potential lesion 608.

FIG. 11 illustrates another embodiment of a lesion identification system 700. The lesion correlator 701 operates on the computing device 102, with similar functionality to the lesion matching engine 110 of FIG. 1. However, in this example, lesions are correlated using probability mapping. Real time ultrasound imaging guidance is provided by using at least two optical cameras 702 and a projector 402. The optical cameras 702 operate to capture multiple images of a patient's torso. Multiple stereotactic optical images are analyzed in combination with previously acquired x-ray images at the computing device 102.

In this example the artificial intelligence image analyzer 724 is configured to match regions of a breast between two different imaging modalities. In some examples, deep learning models are utilized to generate probabilities that a target lesion identified in one type of image is located at any given location on another type of image. For example, the target lesion 712 shown in the tomosynthesis view 710 is analyzed to determine the probability of its location on the ultrasound image 708.

In some examples a probability mapper 728 generates a probability mapping for the breast that indicates where the potential lesion 714 is most likely to be located in a different type of image. In some examples, this could be optical images obtained by the optical cameras 702. The potential lesion 714 is indicated on the ultrasound image with a color gradient, with the center representing the highest likelihood of the target lesion being located there. In some examples, the probability mapping is a visual map and is laid over an ultrasound image or tomosynthesis image, as shown in the GUI 730 of FIG. 11. In other examples, the probability mapping is a visual map projected onto the patient's actual breast during an ultrasound examination using the projector 704. The potential lesion 714 is indicated by the colored regions of the probability map. This visual probability map is used to guide a healthcare practitioner H in obtaining ultrasound images using the ultrasound probe 302.

In some examples, the tracking system 154 and navigation system 156 operate in conjunction with the lesion correlator 701 to guide a healthcare practitioner H during an ultrasound imaging session. The current location of the ultrasound probe 302 is communicated to the computing device 102 and the current location of the probe is indicated visually on the images presented on the GUI 730 in real time.

Referring now to FIG. 12, an example method 800 of locating a region of interest within a breast is described. In some examples, the system of FIG. 11 operates to perform this method 800.

At operation 802, a series of stereo optical images of at least one breast are captured. This is typically performed as the patient is lying prone on an imaging table or other support. Images are captured with two or more optical cameras 702 positioned over the patient.

At operation 804, at least one tomosynthesis image of the breast is accessed. In some embodiments, the tomosynthesis image(s) are accessed at a computing device 102 in response to receiving input from a user. In some examples, the tomosynthesis image(s) are accessed from an electronic medical record associated with the patient being imaged. In some embodiments, the tomosynthesis image(s) are then presented on a display of the computing device 102.

At operation 806, an indication of a target lesion on the tomosynthesis image is received. In some examples, the indication is received from the healthcare provider H at the x-ray computing device of FIG. 1. An example of the indication of the target lesion 712 is shown in the GUI 130 of FIG. 11. As described above with respect to FIG. 9, there are other ways in which the target lesion can be indicated.

At operation 808, a co-registration image analysis of the optical images and tomosynthesis images is performed. In some embodiments, artificial intelligence algorithms for region matching are used to generate a virtual deformable of the breast that both the optical images and tomosynthesis images can be co-registered into. In some examples, the artificial intelligence algorithm is a deep learning based region matching method.

At operation 810, a probability mapping is created based on the image analysis. The probability mapping indicates a likelihood that the indicated lesion is located at a particular point of the breast.

In the examples shown in FIG. 11, the visual probability map uses color indicators to indicate higher or lower probabilities at various locations on the breast. For example, red could indicate the highest probability and blue could indicate the lowest probability. In other examples, grayscale is used where black indicates highest probability and white indicates lowest probability. As can be seen in FIG. 11, the resulting visual of the probability map will likely include a region of highest probability, indicating where the lesion is most likely to be. This region is surrounded by areas of decreasing probability that extend outward. For example, the region might be red and the colors around it extend from orange to yellow to green to blue. In other examples, the visual probability map is displayed as different types of hashing or shading. In some examples, the probability mapping provides different numerical values for the various probabilities. In some examples, a single target is projected at the point of highest probability.

At operation 812, the probability map is projected onto the patient P. In some examples, the map is only projected onto one breast. In some examples, the map is projected over both breasts of the patient. This provides a healthcare provider H performing ultrasound imaging with a visual guide to a location where the target lesion is most likely to be located.

In some examples, additional feedback can be provided to the healthcare provider H to indicate that the ultrasound probe 302 is nearing the location of the target lesion. In some instances, the ultrasound probe 302 blocks the path of the projection of the probability map onto the patient, creating a shadow. To compensate for this interference with the visual guidance, feedback such as haptic feedback or audio feedback could be used to help a healthcare practitioner H determine when the ultrasound probe 302 is aligned with the target lesion.

In some examples, additional guidance is provided to a healthcare practitioner in the form of real-time navigation assistance. A real time position of an ultrasound probe is tracked during imaging and information regarding the location is provided on a display for the healthcare practitioner. In some examples, the display shows an indication of a present location and orientation of an ultrasound probe in relation to an image of the patient's breast.

The methods and systems described herein provide navigation and lesion matching technology that helps healthcare professionals to quickly and accurately locate mammography lesions under ultrasound. The system enables a healthcare professional to identify a region of interest during mammography. During a subsequence ultrasound examination, the mammogram, target region of interest, and b-mode imaging are displayed simultaneously. This guides the professional to the region of interest while simultaneously automating documentation of the probe's position, orientation, and annotations. Once the professional has navigated to the region of interest, the system automatically analyzes the images, matches the lesion, and provides a visual confidence indicator.

The systems and methods provided herein allow a healthcare professional to navigate within 1 cm of a target lesion using ultrasound. The artificial intelligence based system is built on thousands of confirmed cases. Lesions can be matched with greater accuracy than healthcare professionals can accomplish on their own. Additionally, it is faster and easier to locate lesions using ultrasound that were originally identified using x-ray imaging.

Although various embodiments and examples are described herein, those of ordinary skill in the art will understand that many modifications may be made thereto within the scope of the present disclosure. Accordingly, it is not intended that the scope of the disclosure in any way be limited by the examples provided.

What is claimed is:

1. A method of locating of a lesion within a breast, the method comprising:
receiving, at a computing system an indication of a location of a target lesion within the breast on a first image of the breast obtained by a first imaging modality;
recording a first set of location coordinates of the target lesion indicated on the first image;
receiving, at the computing system, a second image of the breast obtained by a second imaging modality;
analyzing, at an artificial intelligence engine operating on the computing system, the first image including the target lesion and the second image to generate a virtual deformable model;
co-registering the first image and the second image into the virtual deformable model;
based on the analysis of the first image and of the second image, determining a probability that the target lesion corresponds to each location of the breast;
generating a probability mapping comprising visual indication of a probability of each location on the breast corresponding to the target lesion;
outputting an indicator of probability for display on a graphical user interface, the indicator comprising the probability mapping;
receiving transmissions in real time from an ultrasound probe indicating its position at the breast;
navigating to a location of the breast based at least in part on the received transmissions and the probability mapping;
receiving a third image associated with the location of the breast, wherein the third image is an ultrasound image; and
analyzing, using the artificial intelligence engine, the third image to generate a confidence score indicating a likelihood that a potential lesion in the third image matches the target lesion in the first image, wherein analyzing the third image comprises:
converting the first set of location coordinates into a second set of location coordinates for use in ultrasound imaging modality;
identifying the potential lesion within the area of the breast corresponding to the second set of location coordinates of the target lesion; and
analyzing, with the artificial intelligence engine, the first image including the target lesion and the third image including the potential lesion to correlate the first image and the third image.

2. The method of claim 1, further comprising recording location coordinates of the potential lesion, and wherein analyzing the first image and the second image comprises comparing location coordinates of the target lesion and location coordinates of the potential lesion.

3. The method of claim 2, wherein the second set of location coordinates comprise a clock position relative to a nipple of the breast, a depth from a surface of the breast, and a distance from the nipple.

4. The method of claim 1, wherein the target lesion and the potential lesion are indicated by receiving a selection on an image of the breast presented on a display of the computing device.

5. The method of claim 1, wherein the first imaging modality is digital breast tomosynthesis.

6. The method of claim 1, wherein the first imaging modality is magnetic resonance imaging (MRI).

7. The method of claim 1, wherein the second imaging modality comprises stereo optical imagery.

8. The method of claim 1, wherein analyzing the first image and the third image is performed using an artificial intelligence system trained using a library of digital breast tomosynthesis cases and corresponding diagnostic ultrasound cases.

9. The method of claim 1, wherein analyzing the third image comprises comparing form factors of breast tissue surrounding the target lesion and the potential lesion.

10. The method of claim 1, wherein the indicator comprises displaying at least one of a shape, a color, a numerical value, and a reference on the second image.

11. A lesion identification system comprising:
a processing device; and
a memory storing instructions that, when executed by the processing device, facilitate performance of operations, comprising:
 accessing an x-ray image of a breast, the x-ray image including an identified lesion indicated with a visual marker;
 recording a first set of location coordinates of the identified lesion indicated on the x-ray image;
 receiving an optical image of the breast;
 analyzing, at an artificial intelligence engine, the x-ray image including the identified lesion and the optical image to generate a virtual deformable model;
 co-registering the x-ray image and the optical image into the virtual deformable model;
 based on the analysis of the x-ray image and of the optical image, determining a probability that the identified lesion corresponds to each location of the breast;
 generating a probability mapping comprising visual indication of a probability of each location on the breast corresponding to the indicated lesion;
 outputting an indicator of probability for display on a graphical user interface, the indicator comprising the probability mapping;
 receiving transmissions in real time from an ultrasound probe indicating its position at the breast;
 navigating to a location of the breast based at least in part on the received transmissions and the probability mapping;
 receiving an ultrasound image associated with the location of the breast; and
 analyzing, using the artificial intelligence engine, the ultrasound image to generate a confidence score indicating a likelihood that a potential lesion in the ultrasound image matches the identified lesion in the x-ray image, wherein analyzing the ultrasound image comprises:
  converting the first set of location coordinates into a second set of location coordinates for use in ultrasound imaging modality;
  identifying the potential lesion within the area of the breast corresponding to the second set of location coordinates of the identified lesion;
  analyzing, with the artificial intelligence engine, the x-ray image including the identified lesion and the ultrasound image including the potential lesion to correlate the x-ray image and the ultrasound image;
  generating the confidence score; and
  displaying an output associated with the confidence score on a graphical user interface.

12. The system of claim 11, wherein the first set of location coordinates identifies a location of the target lesion while the breast is under compression; wherein the second set of location coordinates identifies a location of the potential lesion while the breast is not under compression.

13. The system of claim 12, where the operations further comprise analyzing form factors of the breast tissue surrounding the identified lesion and the potential lesion to generate the confidence score.

14. The system of claim 11, wherein the ultrasound image is analyzed using an artificial intelligence lesion classifier of the artificial intelligence engine, the artificial intelligence lesion classifier being trained on digital breast tomosynthesis images and corresponding ultrasound images.

15. The system of claim 14, wherein the artificial intelligence lesion classifier analyzes lesions for correlations in one or more of density, stiffness, shape, margins, orientation, texture, pattern, size, and depth within the breast.

16. The system of claim 11, wherein the ultrasound image is received from an ultrasound system, the confidence score is communicated to a display in communication with the ultrasound system, and a visual indication of the confidence score is displayed on the display in communication with the ultrasound system as a visual indicator on the ultrasound image.

17. A non-transitory machine-readable storage medium, comprising executable instructions that, when executed by a processor, facilitate performance of operations, comprising:
 obtaining data for a target lesion from a data store, wherein the data was obtained with x-ray imaging and includes at least an x-ray image of the target lesion and a first set of location coordinates for a location of the target lesion within a breast;
 receiving, at the computing system, an optical image of the breast;
 analyzing, at an artificial intelligence engine operating on the computing system, the x-ray image including the target lesion and the optical image to generate a virtual deformable model;
 co-registering the x-ray image and the optical image into the virtual deformable model;
 based on the analysis of the x-ray image and of the optical image, determining a probability that the target lesion corresponds to each location of the breast;
 generating a probability mapping comprising visual indication of a probability of each location on the breast corresponding to the target lesion;
 outputting an indicator of probability for display on a graphical user interface, the indicator comprising the probability mapping;
 receiving transmissions in real time from an ultrasound probe indicating its position at the breast;
 navigating to a location of the breast based at least in part on the received transmissions and the probability mapping;
 recording an ultrasound image of the breast associated with the location;
 analyzing, using the artificial intelligence engine, the ultrasound image to generate a confidence score indicating a likelihood that a potential lesion in the ultrasound image matches the target lesion in the x-ray image, wherein analyzing the ultrasound image comprises:
  converting the first set of location coordinates into a second set of location coordinates for use in ultrasound imaging modality;

identifying a potential lesion within the area of the breast corresponding to the second set of location coordinates of the target lesion;

analyzing, with the artificial intelligence engine, potential lesion to compare the potential lesion to the target lesion and determine a level of confidence that the potential lesion corresponds to the target lesion; and outputting an indicator of the level of confidence on a graphical user interface.

18. The non-transitory machine-readable storage medium of claim 17, wherein the operations further comprise:

recording an image of breast tissue using digital breast tomosynthesis;

receiving an indication on the image of a target lesion within the breast;

determining the first set of location coordinates for the location of the target lesion within the breast; and saving the indication and the first set of location coordinates of the target lesion in the data store.

* * * * *